(12) United States Patent
Kuang et al.

(10) Patent No.: US 10,826,672 B2
(45) Date of Patent: Nov. 3, 2020

(54) DYNAMIC RESOURCE ALLOCATION AMONG DIFFERENT OFDM NUMEROLOGY SCHEMES

(71) Applicant: Panasonic Intellectual Property Corporation of America, Torrance, CA (US)

(72) Inventors: Quan Kuang, Hessen (DE); Hidetoshi Suzuki, Kanagawa (JP); Alexander Golitschek Edler Von Elbwart, Hessen (DE); Sujuan Feng, Hessen (DE); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/246,233

(22) Filed: Jan. 11, 2019

(65) Prior Publication Data
US 2019/0149309 A1 May 16, 2019

Related U.S. Application Data

(63) Continuation of application No. PCT/JP2017/022473, filed on Jun. 19, 2017.

(30) Foreign Application Priority Data

Aug. 12, 2016 (EP) ..................................... 16184078

(51) Int. Cl.
*H04L 5/00* (2006.01)
*H04L 27/26* (2006.01)
(Continued)

(52) U.S. Cl.
CPC .......... *H04L 5/0094* (2013.01); *H04L 5/0007* (2013.01); *H04L 5/0037* (2013.01);
(Continued)

(58) Field of Classification Search
None
See application file for complete search history.

(56) References Cited

U.S. PATENT DOCUMENTS

| 2015/0180622 | A1* | 6/2015 | Yoo ....................... H04L 5/0007 370/330 |
| 2016/0112992 | A1* | 4/2016 | Bhushan ........... H04W 72/0446 370/330 |

OTHER PUBLICATIONS

3GPP TSG-RAN WG1 Meeting 85, May 23-27, 2016, Nanjing, China, Panasonic, "Discussion on the multiplexing of different numerologies", R1-164985 (Year: 2016).*

(Continued)

*Primary Examiner* — Shripal K Khajuria
(74) *Attorney, Agent, or Firm* — Seed IP Law Group LLP

(57) ABSTRACT

The present disclosure relates to a resource allocation procedure for allocating time-frequency radio resources by a scheduler in a mobile communication system. A plurality of numerology schemes are defined, each partitioning a plurality of radio resources of the mobile communication system into resource scheduling units in a different manner. A reference resource set is defined per numerology scheme, each being associated to a set of radio resources usable for being allocated according to the respective numerology scheme. The reference resource set of at least one numerology scheme overlaps with the reference resource set of at least another numerology scheme in the frequency and/or time domain. The resource allocation procedure is performed for allocating radio resources to one or more user terminals according to the numerology schemes. The resource allocation procedure is performed for each numerology scheme based on a scheduling time interval defined for the respective numerology scheme.

15 Claims, 17 Drawing Sheets

(51) Int. Cl.
*H04W 24/08* (2009.01)
*H04W 72/04* (2009.01)

(52) U.S. Cl.
CPC ......... *H04L 27/2607* (2013.01); *H04W 24/08* (2013.01); *H04W 72/042* (2013.01); *H04L 5/0044* (2013.01); *H04L 5/0053* (2013.01)

(56) References Cited

OTHER PUBLICATIONS

International Search Report of PCT application No. PCT/JP2017/022473 dated Aug. 15, 2017.
3GPP TSG RAN WG1 meeting #84 bis, R1-162549, "Discussion on numerology and frame structure", Apr. 2016.
3GPP TSG-RAN WG1 #85, R1-164692, "Numerology and TTI multiplexing for NR Forward Compatibility Analysis", May 2016.
3GPP TSG-RAN WG1 Meeting 85, R1-164985, "Discussion on the multiplexing of different numerologies", May 2016.
3GPP TSG RAN WG1 Meeting #85, R1-164274, "Frame structure design for NR", May 2016.
3GPP TR 38.913 V0.3.0, "3rd Generation Partnership Project; Technical Specification Group Radio Access Network; Study on Scenarios and Requirements for Next Generation Access Technologies; (Release14)", Mar. 2016.
3GPP TSG RAN WG1 Meeting #85, R1-165175, "Initial views and evaluation results on non-orthogonal multiple access for NR", May 2016.
3GPP TSG RAN WG1 #84bis, R1-163656, "We on multiple access for NR", Apr. 2016.
European Office Action dated May 12, 2020 for the related European Patent Application No. 17839063.9, 6 pages.

* cited by examiner

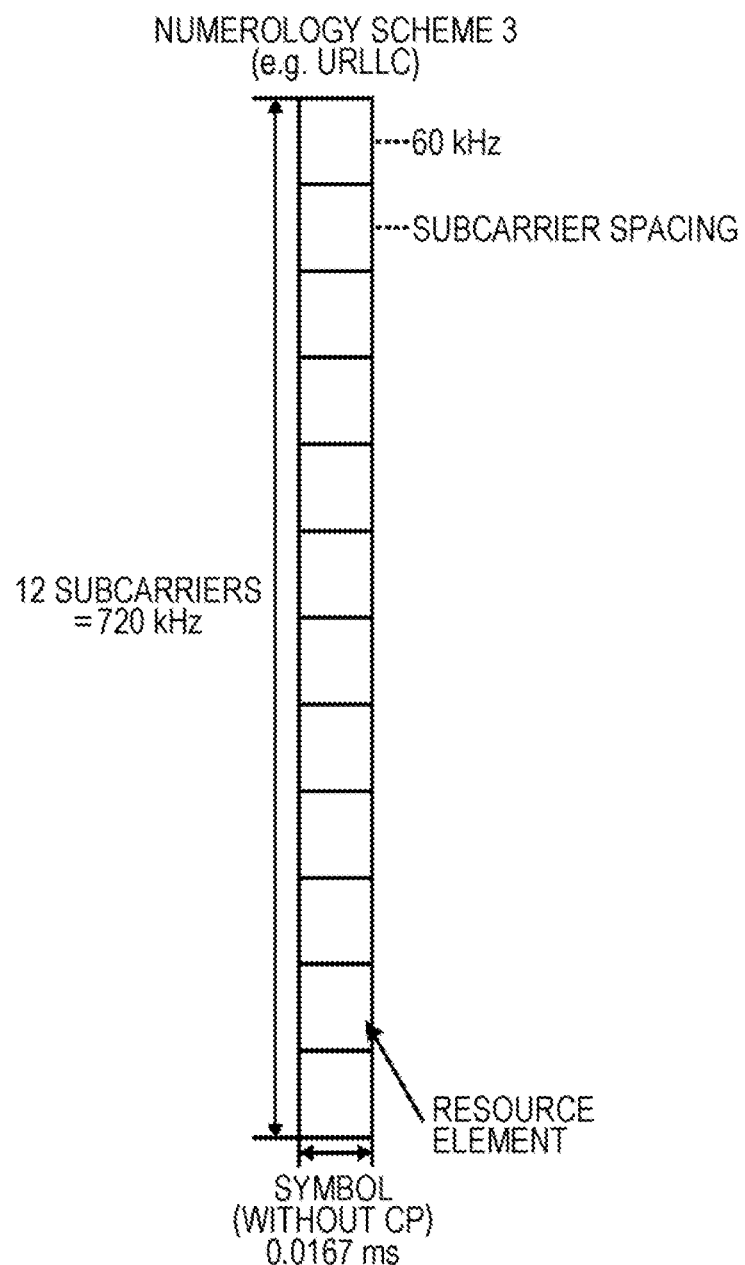

FIG. 9
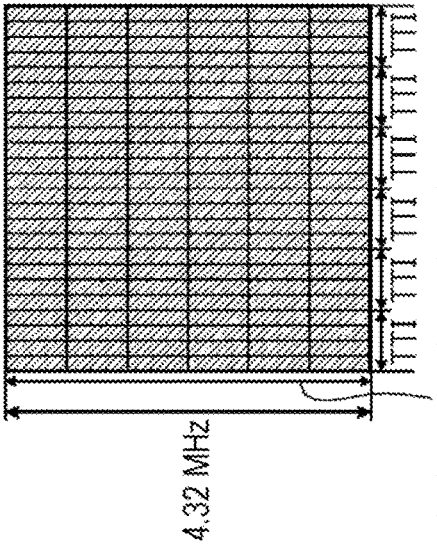
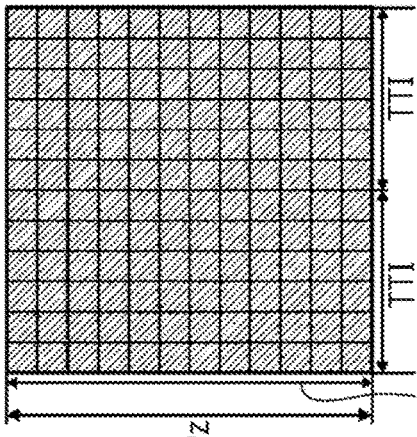
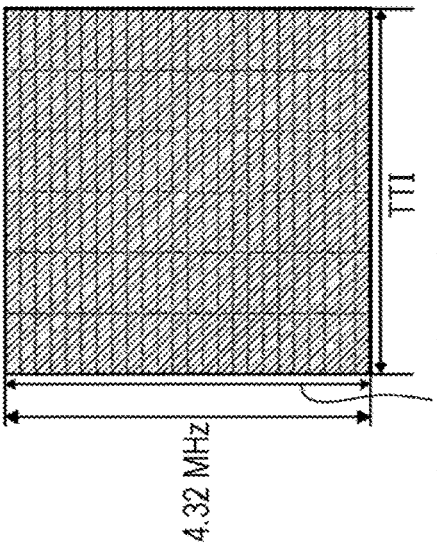
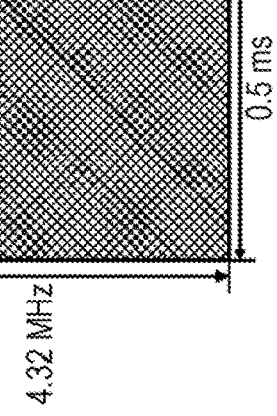
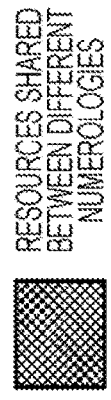

DYNAMIC RESOURCE ALLOCATION AMONG DIFFERENT OFDM NUMEROLOGY SCHEMES

BACKGROUND

1. Technical Field

The present disclosure relates to an improved radio resource allocation procedure in a mobile communication system involving several different OFDM numerology schemes. The present disclosure is providing the corresponding methods, radio base station and user terminals.

2. Description of the Related Art

Targeting at providing the first release of technical specifications for the next generation cellular technology (aka 5G) in June 2018 (Release-15), the studies for 5G within 3GPP have already started. At the 3GPP TSG RAN #71 meeting (Gothenburg, March 2016), the first 5G Study Item, "Study on New Radio Access Technology" involving RAN1, RAN2, RAN3 and RAN4 was approved. This is an important 3GPP milestone as this 5G Study Item is expected to become the Release-15 Work Item that defines the first 5G standard.

The aim of the Study Item is to develop a "New Radio (NR)" access technology to meet a broad range of use cases including enhanced mobile broadband (eMBB), massive MTC (mMTC), critical MTC, and additional requirements defined during the RAN requirements study. It is expected that the new Radio Access Technology (RAT) will consider frequency ranges up to 100 GHz (see e.g. 3GPP TR 38.913 "Study on Scenarios and Requirements for Next Generation Access Technologies", current version 0.3.0).

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks. A second objective is to achieve forward compatibility.

It is assumed that the normative specification will occur in two phases: Phase I (to be completed in June 2018) and Phase II (to be completed in December 2019). The phase-I specification of the new RAT must be forward compatible (in terms of efficient co-cell/site/carrier operation) with the phase-II specification and beyond, while backward compatibility to LTE is not required. The phase-II specification of the new RAT builds on the foundation of the phase-I specification and shall meet all the requirements set for the new RAT. Smooth future evolution beyond Phase II needs to be ensured to support later advanced features and to enable support of service requirements identified later than Phase II specification.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP based OFDM and DFT-S-OFDM are used as waveform for downlink and uplink transmission, respectively. One of the design targets in NR is to seek the common waveform as much as possible for downlink, uplink and sidelink. It has been identified by some companies that to introduce DFT spreading might not be needed for some cases of uplink transmission.

Besides the waveform, some basic frame structure(s) and channel coding scheme(s) will be developed to achieve the above-mentioned objectives.

The study shall also seek a common understanding on what is required in terms of radio protocol structure and architecture to achieve the above-mentioned objectives.

Furthermore, the technical features which are necessary to enable the new RAT to meet the above-mentioned objectives shall be studied, including efficient multiplexing of traffic for different services and use cases on the same contiguous block of spectrum.

As identified in TR 38.913, the various use cases/deployment scenarios for NR have diverse requirements in terms of data rates, latency, and coverage. For example, eMBB is expected to support peak data rates (20 Gbps for downlink and 10 Gbps for uplink) and user-experienced data rates in the order of three times what is offered by IMTAdvanced. On the other hand, in case of URLLC, the tighter requirements are put on ultra-low latency (0.5 ms for UL and DL each for user plane latency) and high reliability (1-10-5 within 1 ms). Finally, mMTC requires high connection density (1,000,000 devices/km$^2$ in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency applications may require a shorter symbol duration (larger subcarrier spacing) and/or fewer symbols per scheduling interval (aka, TTI) than an mMTC application. Furthermore, deployment scenarios with large channel delay spreads require a longer CP duration than scenarios with short delay spreads. The subcarrier spacing should be optimized accordingly to retain the similar CP overhead.

In 3GPP RAN1#84bis meeting (Busan, April 2016), it was agreed that it is necessary for NR to support more than one value of subcarrier-spacing. The values of subcarrier spacing are derived from a particular value of subcarrier-spacing multiplied by N where N is an integer. In the latest RAN1 meeting, RAN1#85 (Nanjing, May 2016), it was concluded as a working assumption that the LTE-based numerology including 15 kHz subcarrier spacing is the baseline design for the NR numerology. For the scaling factor N, it was concluded N=$2^n$ as the baseline design assumption for the NR numerology. The down selection of numerology candidates might be done in the future meetings. Correspondingly, subcarrier spacings of 15 kHz, 30 kHz, 60 kHz . . . are being considered. FIGS. 1A to 1C illustrate three different subcarrier spacings (15 kHz, 30 kHz, and 60 kHz) and the corresponding symbol duration. The symbol duration $T_u$ and the subcarrier spacing $\Delta f$ are directly related through the formula $\Delta f=1/T_u$. In a similar manner as in the LTE systems, the term "resource element" can be used to denote a minimum resource unit being composed of one subcarrier for the length of one OFDM/SC-FMA symbol.

Also in the latest RAN1 meeting, it was agreed that the two OFDM-based waveforms, OFDM with CP and DFT-S-OFDM (SC-FDMA) with CP, should be used as RAN1 NR waveform performance reference. All waveforms proposed in RAN1#84bis and #85 meetings can be evaluated based on the agreed evaluation assumptions. Each company should provide details on the DFT-spreading, guard interval, Tx/Rx filtering and/or windowing applied to OFDM waveform for evaluation. Narrowing down the waveform candidates for NR will be done in future meetings.

It has been also recognized that NR should support flexible network and UE channel bandwidth due to several reasons: NR is expected to support operation in a very wide range of spectrum, ranging from sub-GHz up to tens of GHz with very different possibilities regarding the available spectrum and, hence possible transmission bandwidth. Many frequency bands to be used for NR are not yet fully identified, implying that the size of spectrum allocations is not yet known. NR is expected to support a wide range of applications and use cases, with some requiring very wide UE transmission/reception bandwidth and others requiring very low UE complexity which implies much lower UE transmission/reception bandwidth. Therefore, it was agreed in RAN1#85 that NR physical-layer design should allow for fine granularity in terms of NR carrier bandwidth, and the devices with different bandwidth capabilities can efficiently access the same NR carrier regardless of the NR carrier bandwidth.

In order to support the multiplexing of different services with diverse requirements, it has been agreed in 3GPP RAN1#85 (Nanjing, May 2016) that NR supports the multiplexing of different numerologies within a same NR carrier bandwidth (from the network perspective). On the other hand, from a UE perspective, a UE may support one or more than one usage scenarios (e.g., an eMBB UE or a UE supporting both eMBB and URLLC). Generally speaking, supporting more than one numerology can complicate UE processing.

From the network perspective, it would be beneficial to consider the multiplexing of different numerologies in both a frequency domain (aka FDM) and a time domain (aka TDM) within a NR carrier. One exemplary multiplexing of different numerologies is given in FIG. 2, where numerology 1 could be used for eMBB, numerology 2 for URLLC and numerology 3 for mMTC. The reason why eMBB and URLLC are better to be TDMed is that they both demand a very broad bandwidth, which is necessary for eMBB to achieve high data rates. URLLC needs a broad bandwidth for better frequency diversity to meet the high-reliability requirement. On the other hand, mMTC is considered to be FDMed with eMBB and/or URLLC since it requires only a narrow transmission bandwidth.

In LTE, the frequency-time resources are organized into resource blocks (RBs), where one RB consists of 12 consecutive subcarriers in the frequency domain and one 0.5 ms slot in the time domain. For instance, in 3GPP LTE each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} \times N^{RB}_{SC}$ subcarriers and $N^{DL}_{symb}$ OFDM symbols. $N^{DL}_{RB}$ is the number of resource blocks within the bandwidth. The quantity $N^{DL}_{RB}$ depends on the downlink transmission bandwidth configured in the cell and shall fulfill $$N^{min,DL}_{RB} \leq N^{DL}_{RB} \leq N^{max,DL}_{RB},$$

where $N^{min,DL}_{RB}=6$ and $N^{max,DL}_{RB}=110$ are respectively the smallest and the largest downlink bandwidths, supported by the current version of the specification. $N^{RB}_{SC}$ is the number of subcarriers within one resource block. For normal cyclic prefix subframe structure, $N^{RB}_{SC}=12$ and $N^{DL}_{symb}=7$. The minimum resource granularity to allocate to a UE for data transmission consists of two time-consecutive RBs within one subframe (i.e., one TTI), being referred to as a RB pair. In other words, the minimum resource scheduling unit is a RB pair.

In NR, it is expected that some sort of RB concept to describe the minimum resource granularity as well as resource scheduling unit will be also needed. However, the definition of an RB is traditionally tightly connected to the numerology. Hence, when multiple different numerologies are scheduled, the concept of RBs needs to be revisited. This is an ongoing topic in 3GPP.

It remains unclear how the time-frequency radio resources will be efficiently allocated for the various services according to the different numerologies.

SUMMARY

One non-limiting and exemplary embodiment provides improved resource allocation procedures. The independent claims provide non-limiting and exemplary embodiments. Advantageous embodiments are subject to the dependent claims.

In one general aspect, the techniques disclosed here feature a method for allocating time-frequency radio resources by a scheduler in a mobile communication system. A plurality of numerology schemes are defined, each partitioning a plurality of time-frequency radio resources of the mobile communication system into resource scheduling units in a different manner. A reference resource set is defined per numerology scheme, each reference resource set being associated to a set of time frequency radio resources that are usable for being allocated according to the respective numerology scheme. The reference resource set of at least one numerology scheme overlaps with the reference resource set of at least another numerology scheme in the frequency domain and/or time domain. The method comprises performing by the scheduler a resource allocation procedure for allocating time-frequency radio resources to one or more user terminals according to the plurality of numerology schemes. The resource allocation procedure is performed for each numerology scheme based on a scheduling time interval defined for the respective numerology scheme.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1C illustrates subcarrier spacing 60 kHz and the resulting symbol duration;

FIG. 9 illustrates overlapping nominal resource sets defined for the three numerology schemes of FIG. 5 and the resulting exemplary multiplexing of the three numerology schemes in both the time domain and the frequency domain, according to an exemplary implementation of the first embodiment;

DETAILED DESCRIPTION

A mobile station or mobile node or user terminal or user equipment (UE) is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The terms "radio resources" as used in the set of claims and in the application is to be broadly understood as referring to physical radio resources, such as time-frequency radio resources.

The following exemplary embodiment provides an improved radio resource allocation procedure for the new radio technology envisioned for the 5G mobile communication systems. Only very few things have been agreed on with regard to the 5G mobile communication system such that many assumptions have to be made in the following so as to be able to explain the principles underlying the first embodiment. These assumptions are however to be understood as merely examples that should not limit the scope of the disclosure. A skilled person will be aware that the principles of the present disclosure as laid out in the claims can be applied to different scenarios and in ways that are not explicitly described herein. For example, the new radio technology will be evolving from the radio technology already defined for LTE(-A), although several changes can be expected so as to meet the requirements for 5G mobile communication systems. Consequently, particular exemplary implementations of the various embodiments could still reuse procedures, messages, functions etc. already defined for the LTE(-A) communication systems (according to Release 10/11/12/13/14 etc.) as long as they are equally applicable to the new radio technology for 5G communication systems and as long as they are applicable to the various implementations as explained for the first embodiment.

First Embodiment

In the following a first embodiment for solving the above-mentioned problem(s) will be described in detail. Different implementations and variants of the first embodiment will be explained as well.

Figure 4:
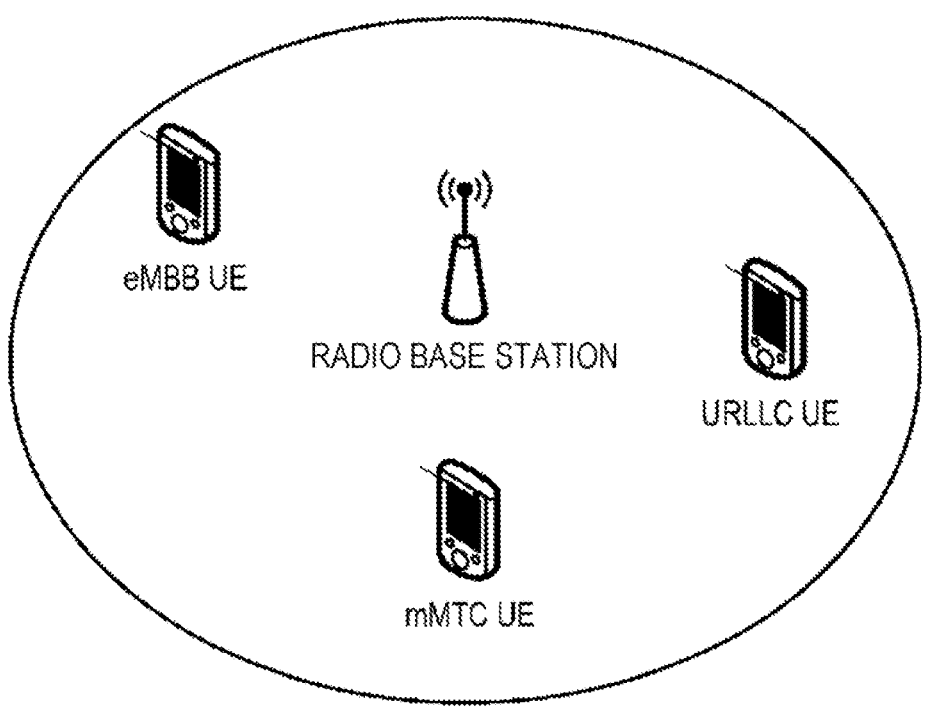
FIG. 4 illustrates a simple deployment scenario with a radio base station and three user terminals.

The first embodiment provides a framework for the resource allocation that enables a dynamic sharing of time-frequency radio resources among various OFDM numerologies while at the same time providing a simple and efficient indication of resource allocations. A simple and exemplary scenario is assumed with a radio base station and several user terminals, as illustrated in FIG. 4. The three illustrated UEs respectively support a different service, namely the mMTC, eMBB, and URLLC services already introduced in the background section.

As discussed in the background section, it is agreed that for the next-generation 5G several different numerologies are to be supported and shall coexist in the mobile communication system, the different numerology schemes being adapted to particular services, such as the eMBB, mMTC, or URLLC services. It should be noted that the 3GPP standardization is at the very beginning and there is a lot of uncertainty as to which particular services will actually be supported. However, for the following explanations of the first embodiment it is exemplarily assumed that the services eMBB, mMTC, and URLLC shall be supported simultaneously by a communication system so as to allow data transmissions for each of these services.

Correspondingly, a respective numerology scheme for each of the services is defined, where the different numerology schemes allow partitioning the available time frequency radio resources of a frequency band (such as a carrier of a particular bandwidth, e.g. 100 MHz, below 6 GHz) into resource scheduling units that can be allocated by a scheduler, such as in a radio base station. For the exemplary scenario that will be used in the following for illustration purposes, the bandwidth of the frequency band is assumed to be 4.3 MHz. The first embodiment and its principles can be equally applied to different frequency bands and bandwidths.

In this connection, the term resource scheduling unit shall be understood as a group of time-frequency radio resources that is the minimum unit that can be scheduled by a scheduler. A resource scheduling unit thus comprises time-frequency radio resources, composed of one or more contiguous subcarriers for the duration of one or more symbols, according to the particular characteristics of the numerology scheme.

In general, numerology schemes are characterized by different parameters such as the subcarrier spacing and the symbol duration (being directly related to each other), the number of subcarriers per resource scheduling unit, the cyclic prefix length, or the TTI length (scheduling time interval; defined by the number of symbols per resource scheduling unit or the absolute time duration per resource scheduling unit from which the number of symbols can be derived). Consequently, numerology schemes may differ from one another by one or more of these numerology characteristics. By appropriately determining the numerology characteristics, one numerology scheme can be tailored to a particular service and its requirements (such as latency, reliability, frequency diversity, data rates etc.). For instance as explained in the background section, the services eMBB and URLLC are similar in that they both demand a very broad bandwidth, however are different in that the URLLC service requires ultra-low latencies. These requirements may result in that a numerology scheme for URLLC services will typically use shorter TTIs (and possibly shorter symbol lengths) than a numerology scheme for the eMBB service. There are no agreements yet on the numerology characteristics to be used for each service.

As will become apparent from below, the main numerology characteristics that differ between the numerology schemes exemplary used for illustrating the principles of the first embodiment are the subcarrier spacing and symbol duration as well as the length of scheduling time interval (i.e. the number of symbols per resource scheduling unit). Although not illustrated in the figures, the length of the cyclic prefix is assumed to be scaled in the same manner as the symbol length, while it is assumed that each numerology scheme partitions the radio resources such that a resource scheduling unit has 12 subcarriers with respective subcarrier spacings according to the numerology scheme. Nevertheless, it should be noted that the first embodiment and its principles are not restricted to merely those different numerology schemes used exemplarily in the following, but can be applied to different numerology schemes and corresponding different numerology characteristics of same. And although in the following explanations only three numerology schemes are defined in total, the principles underlying the first embodiment will equally apply when different sets and different numbers of numerology schemes are defined for the mobile communication system.

Figure 1A:
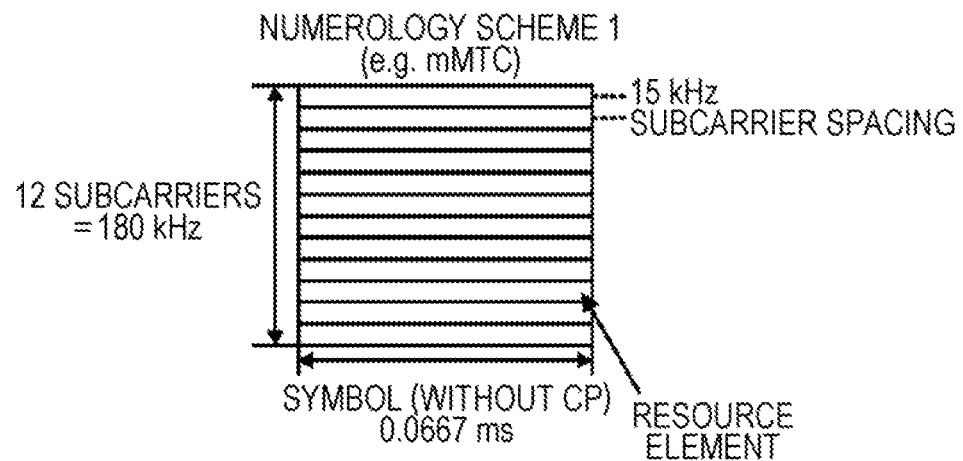
FIG. 1A illustrates subcarrier spacing 15 kHz and the resulting symbol duration.
Figure 1B:
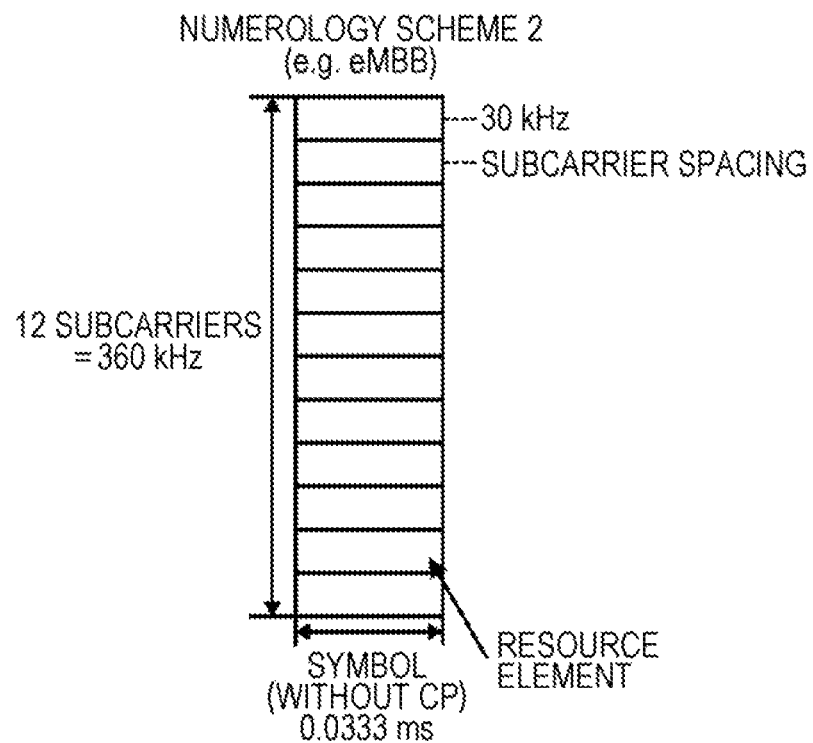
FIG. 1B illustrates subcarrier spacing 30 kHz and the resulting symbol duration.
Figure 5:
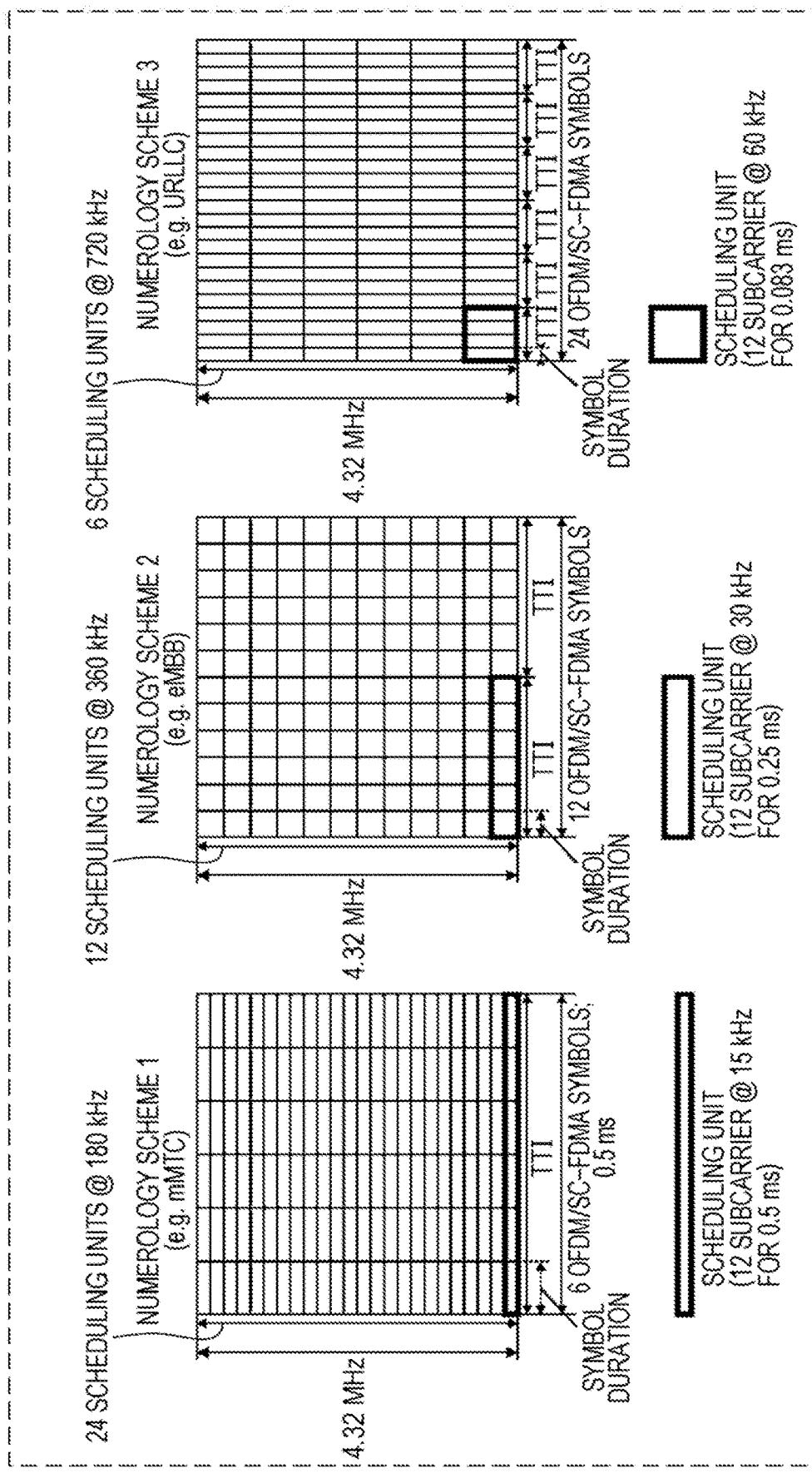
FIG. 5 illustrates the partitioning of radio resources according to three different numerologies schemes into corresponding resource scheduling units.

The different exemplary numerology schemes will be illustrated in connection with FIG. 5 and are based on FIGS. 1A to 1C. FIG. 5 is a simplified illustration of the partitioning of radio resources according to three different numerology schemes. The resulting resource scheduling units are illustrated with a bold square in each of the numerology schemes.

Numerology scheme 1 of FIG. 5 is characterized by having a subcarrier spacing of 15 kHz (with a resulting symbol duration of 66.7 µs; see FIG. 1A), 12 subcarriers and 6 symbols per resource scheduling unit. The resulting resource scheduling unit has a frequency bandwidth of 180 kHz and a length of 0.5 ms (when exemplary considering a cyclic prefix of each 16.7 µs, as e.g. known from LTE systems). Correspondingly, in the frequency domain the bandwidth of the frequency band will be partitioned into 24 resource scheduling units (each with 180 kHz bandwidth). With these numerology characteristics, numerology scheme 1 may be considered for the transmission of data for the mMTC service. A UE following that numerology scheme could thus be theoretically scheduled by the scheduler every TTI, i.e. 0.5 ms.

Numerology scheme 2 is characterized by having a subcarrier spacing of (2×15 kHz=) 30 kHz (with a resulting symbol duration of 33.3 µs; see FIG. 1B), 12 subcarriers and 6 symbols per resource scheduling unit. The resulting resource scheduling unit has thus a frequency bandwidth of 360 kHz and a length of 0.25 ms (when exemplary considering a scaled cyclic prefix of 16.7 µs/2 each). Correspondingly, in the frequency domain the bandwidth of the frequency band will be partitioned into 12 resource scheduling units (each with 360 kHz bandwidth). With these numerology characteristics, numerology scheme 2 may be considered for the transmission of data for the eMBB service. A UE following that numerology scheme could thus be theoretically scheduled by the scheduler every TTI, i.e. 0.25 ms.

Numerology scheme 3 is characterized by having a subcarrier spacing of (4×15 kHz=) 60 kHz (with a resulting symbol duration of 16.7 µs; see FIG. 1C), 12 subcarriers and 4 symbols per resource scheduling unit. The resulting resource scheduling unit has thus a frequency bandwidth of 720 kHz and a length of 0.0833 ms (when exemplary considering a scaled cyclic prefix of 16.7 µs/4 each). Correspondingly, in the frequency domain the bandwidth of the frequency band will be partitioned into 6 resource scheduling units (each with 720 kHz bandwidth). With these numerology characteristics, numerology scheme 3 may be considered for the transmission of data for the URLLC service. A UE following that numerology scheme could thus be theoretically scheduled by the scheduler every TTI, i.e. 0.0833 ms.

Consequently, the time-frequency radio resources of the frequency band that are to be shared among the different numerologies can be interpreted differently based on the numerology characteristics underlying the different numerology schemes. The different numerology schemes shall coexist in the mobile network, and radio resources of the different numerology schemes should be available for being allocated to user terminals as needed.

In turn, the user terminals can support one or more of the numerology schemes. In the exemplary scenario illustrated in FIG. 4, it is assumed that the UEs each only support one (different) service.

Figure 2:
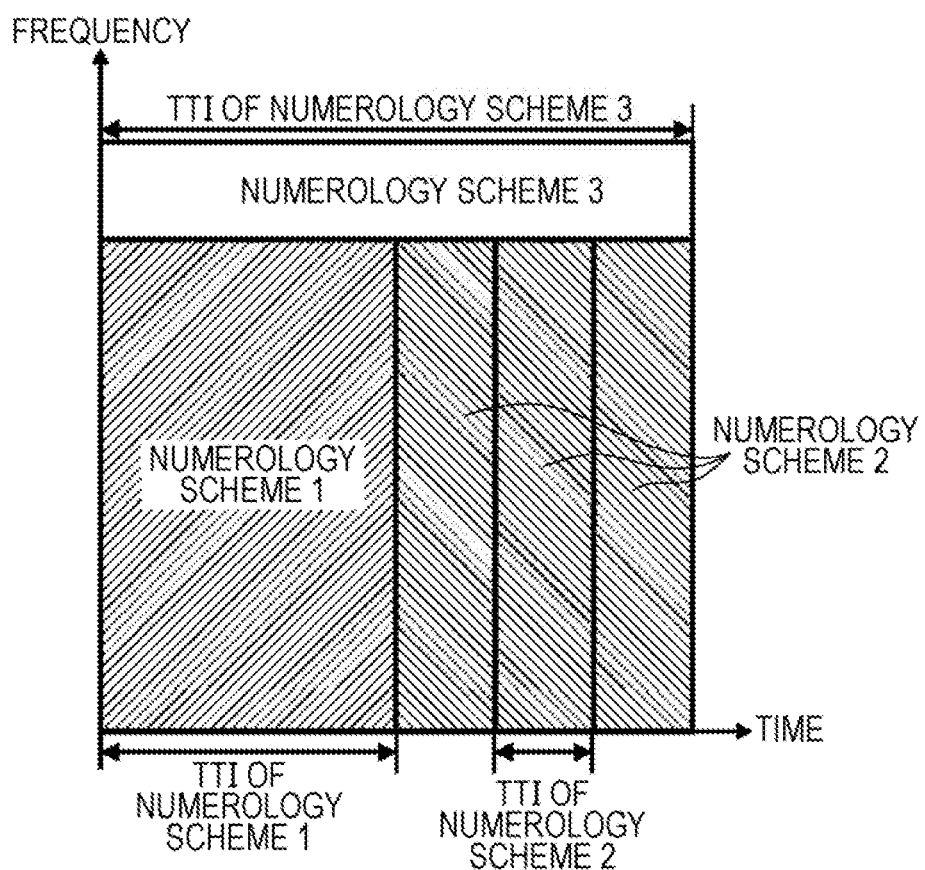
FIG. 2 illustrates an exemplary multiplexing of different OFDM numerologies in both the time domain and the frequency domain.
Figure 3:
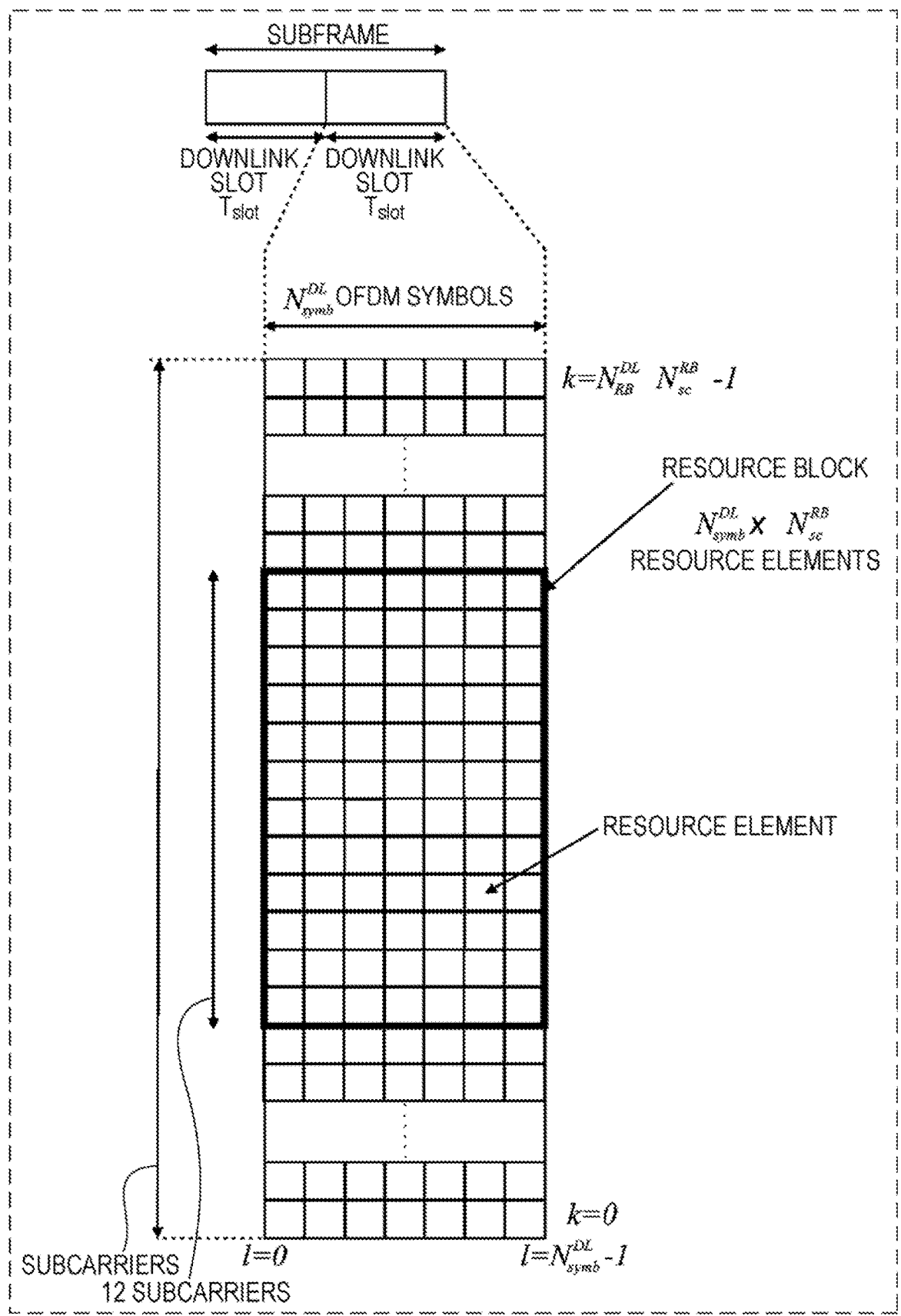
FIG. 3 shows an exemplary downlink resource grid of a downlink slot of a subframe as defined for 3GPP LTE (Release 8/9)

As discussed in the background section, there are several possibilities on how to multiplex the different numerologies within the frequency band and its radio resources in the frequency domain and/or the time domain, where FIG. 2 shows but one example. Other possible multiplexing schemes that will be used in the following to explain the first embodiment are illustrated in FIGS. 6 and 7.

In general, so as to be able to allocate radio resources for data transmissions according to each numerology scheme, the available time-frequency radio resources of the frequency band should be split in an appropriate manner between the different numerology schemes coexisting in the system. Correspondingly, each numerology scheme is associated to a particular set of radio resources among the available radio resources of the band which are then usable by the scheduler (such as the radio base station) for being allocated according to that numerology scheme, i.e. so as to allocate radio resources to transmit data for the corresponding service (URLLC, mMTC, mMBB) following the numerology characteristics of the particular numerology scheme.

In view of that the traffic amount for each service varies with time, this multiplexing of different coexisting numerology schemes for the services should also be flexible. The available radio resources need to be shared between the services, respectively the corresponding numerology schemes, in an efficient manner such that resource sharing among the numerologies and the corresponding services is possible. Correspondingly, there is a need to allow an improved resource allocation to dynamically configure the kind and amount of multiplexing of the numerology schemes. Furthermore, the signaling of the resource allocation to the several UEs should be as simple and compact as possible. In the following, several implementations of the first embodiment will be provided so as to provide such an improved resource allocation procedure.

Figure 6:
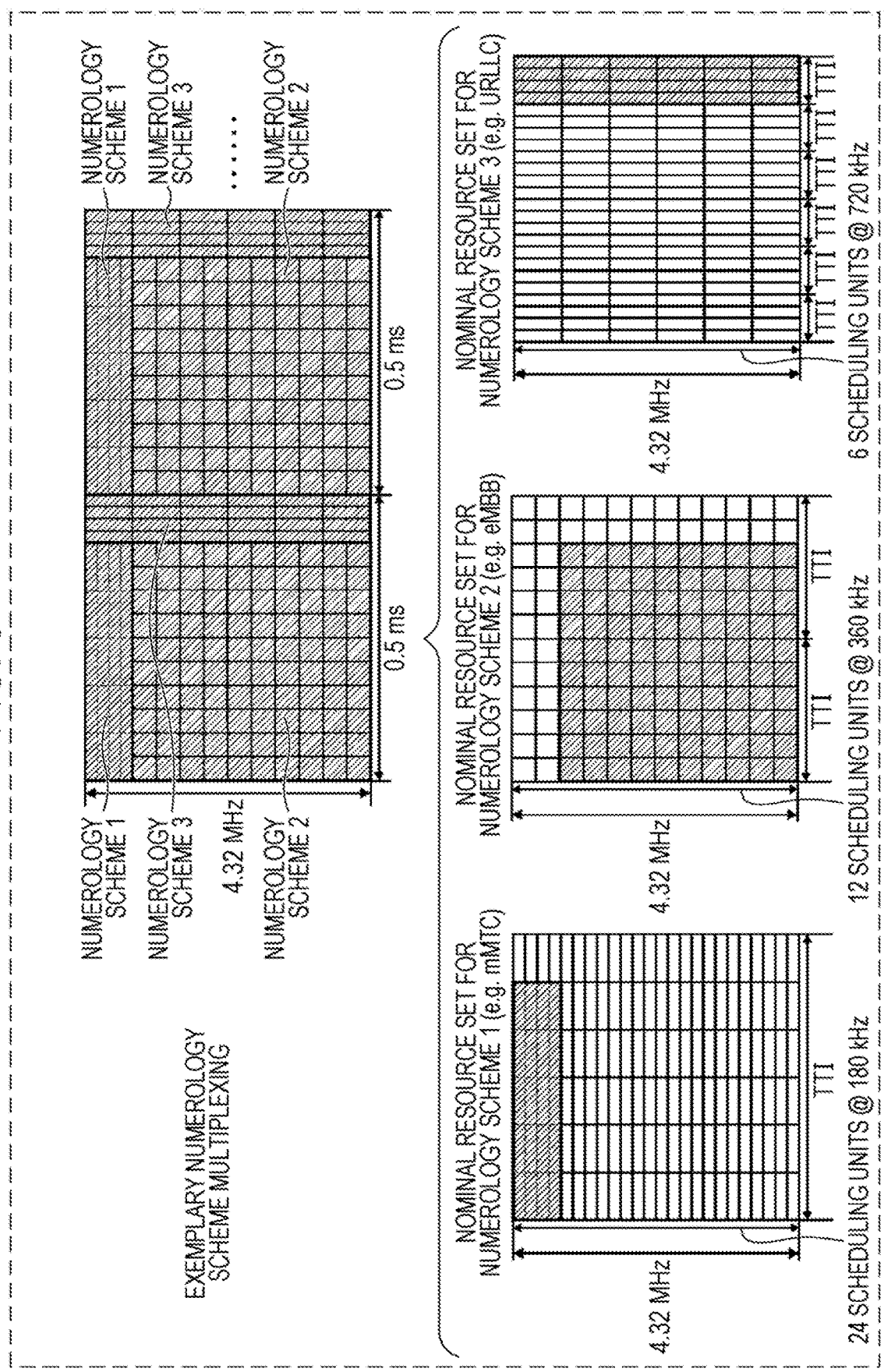
FIG. 6 illustrates non-overlapping nominal resource sets defined for the three numerology schemes of FIG. 5 and the resulting exemplary multiplexing of the three numerology schemes in both the time domain and the frequency domain, according to an exemplary implementation of the first embodiment.
Figure 7:
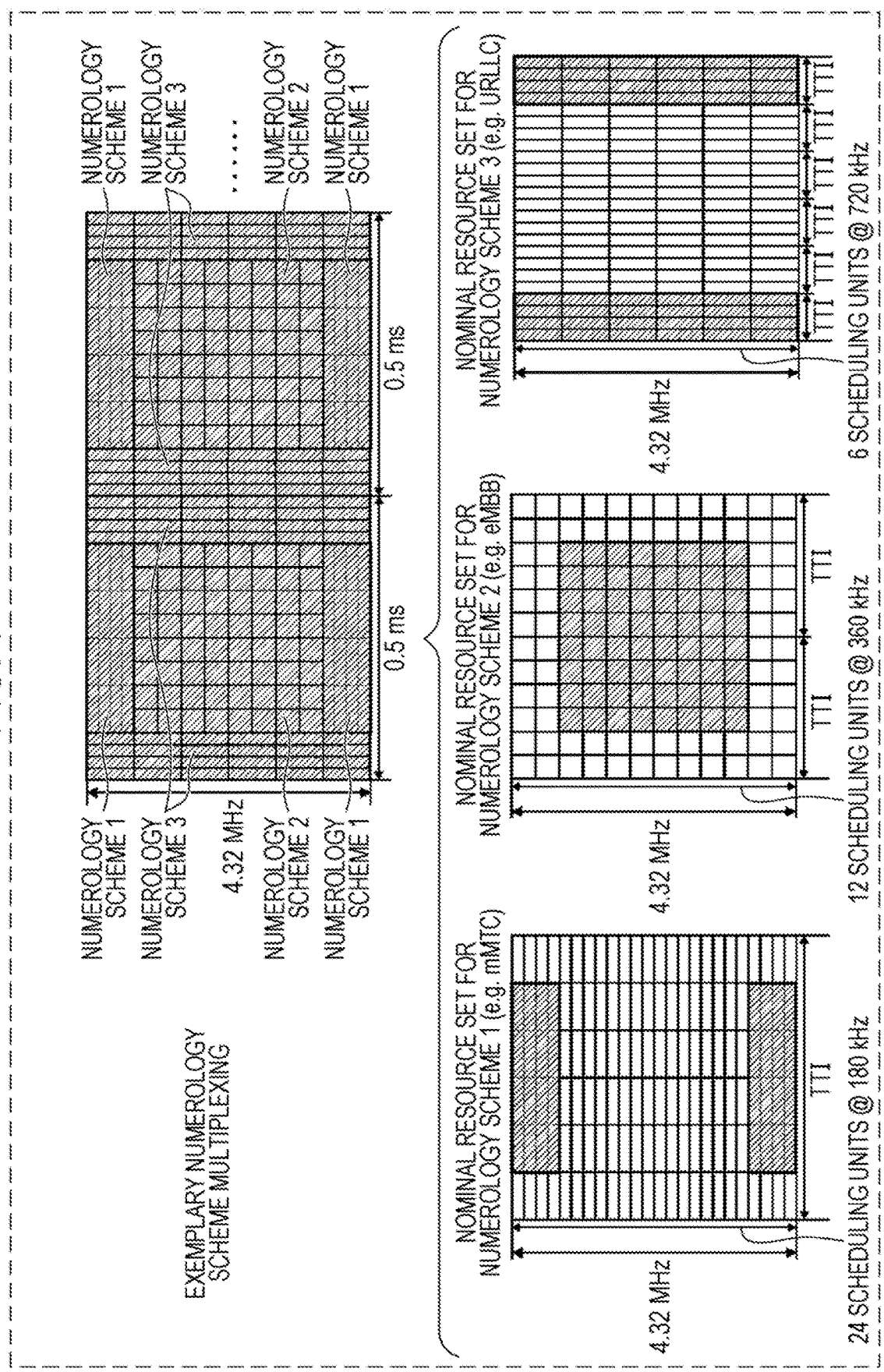
FIG. 7 illustrates non-overlapping nominal resource sets defined for the three numerology schemes of FIG. 5 and the resulting exemplary multiplexing of the three numerology schemes in both the time domain and the frequency domain, according to an exemplary implementation of the first embodiment.

FIGS. 6 and 7 illustrate exemplary numerology multiplexing schemes for a frequency band having a bandwidth of 4.32 MHz and with the scheduling time intervals as introduced in connection with FIG. 5. Furthermore, guard frequency/periods may be needed at the boundary of the radio resources for the different numerology schemes. However, in the figures (such as FIG. 6) and in the following explanation, the use of such guard frequency bands and guard intervals are not taken into account; nevertheless, the principles of the first embodiment apply equally to scenarios with guard frequency bands and guard intervals. The lower part of FIGS. 6 and 7 show which radio resources are associated to which the numerology scheme and thus illustrate the scheduling opportunities for each traffic type/family. The radio resources associated to one numerology scheme can be termed exemplarily reference resource set (in other possible term would be nominal resource set).

Numerology scheme 1 for mMTC and numerology scheme 2 for eMBB are only multiplexed in the frequency domain and not in the time domain. The numerology schemes 1 and 2 however are time multiplexed with numerology scheme 3 for URLLC which covers the whole bandwidth of the frequency band. In the nominal resource sets for the numerology schemes of FIG. 6, it is assumed that each numerology scheme is associated with radio resources that are contiguous in both the frequency and time domain. However, this is only an example, and numerology schemes (i.e. the respective nominal resource sets) may be associated also with radio resources that are not contiguous in the frequency and/or time domain. Correspondingly, in the exemplary implementation according to FIG. 7 the numerology scheme 1 is associated with non-contiguous radio resources at the upper and lower end of the frequency band. Furthermore, the numerology scheme 3 is associated with non-contiguous time periods, in this example at the beginning and the end of the illustrated time period (which corresponds to the longest TTI among the numerology schemes in the system). In general, the available radio resources should be associated to the coexisting numerology schemes so as to it is possible for the scheduler to allocate radio resources to each of the numerology schemes and thus to accommodate several services simultaneously. The nominal resource sets as defined in FIGS. 6 and 7 always combine to form the same non-overlapping multiplexing scheme as illustrated in the upper part of FIGS. 6 and 7. In other words, the multiplexing of the numerology schemes does not change over time.

According to the nominal resource sets assumed in FIGS. 6 and 7 for the three numerology schemes, radio resources associated to one numerology scheme are exclusively available to only that numerology scheme. In other words, the different numerology schemes, particularly the associated radio resources (i.e. the nominal resource set) of the numerology schemes that are usable for being allocated according to that numerology scheme, do not overlap. Consequently, no sharing of radio resources is possible between the different numerology schemes, and thus the scheduler has no flexibility to reuse radio resources "reserved" for one numerology scheme for allocating same to another UE (and/or service) according to another numerology scheme. For instance, at a time instance where no (or only little) resources are needed to be allocated for serving the URLLC service (i.e. numerology scheme 3), the radio resources of the nominal resource set of numerology scheme 3 are basically wasted, since they cannot be allocated according to another numerology scheme for serving another service.

Figure 8:
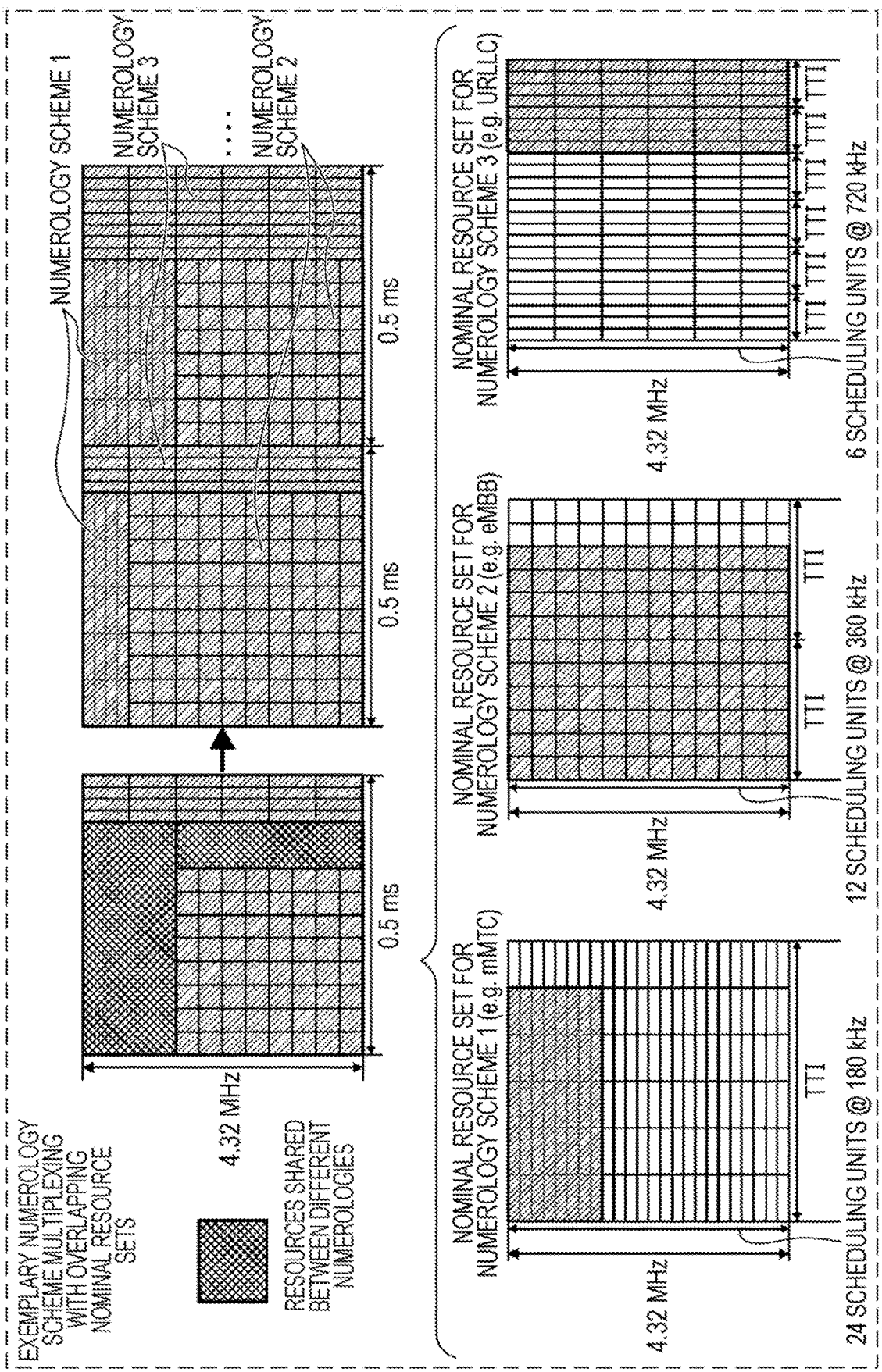
FIG. 8 illustrates overlapping nominal resource sets defined for the three numerology schemes of FIG. 5 and the resulting exemplary multiplexing of the three numerology schemes in both the time domain and the frequency domain, according to an exemplary implementation of the first embodiment.

According to further implementations of the first embodiment, the nominal resource sets of the different numerology schemes are defined in such a manner that the nominal resource set of at least one numerology scheme at least partially overlaps the nominal resource set of at least one other numerology scheme. One exemplary implementation of this concept is illustrated in connection with FIG. 8. As apparent therefrom, the various nominal resource sets are defined such that each of the nominal resource sets comprises radio resources that are also associated with the nominal resource set of another numerology scheme. In other words, the nominal resource sets of the different numerology schemes overlap and thus share radio resources among each other. The overlapping of the radio resources can be in the frequency domain and/or in the time domain. FIG. 8 illustrates the shared radio resources in the upper left part of the figure; the corresponding shared area of the radio resources is shaded crosswise.

By providing overlapping areas in the nominal resource sets, the resource allocation procedure performed by a scheduler can be significantly improved, since the shared radio resources can be flexibly allocated during the resource allocation according to different numerology schemes and thus to the different services as needed. FIG. 8 illustrates only two out of several different possibilities on how the radio resources available within a time period of 0.5 ms can be multiplexed between the different numerology schemes, based on the overlapping nominal radio resources sets defined at the bottom of FIG. 8. As apparent therefrom, in the first 0.5 ms time period, the multiplexing resulting from the actual resource allocation performed by the scheduler can be the same as the one resulting from the non-overlapping nominal resource sets as defined in FIG. 6. However, it is assumed for illustration purposes that in the next 0.5 ms significantly more URLLC traffic needs to be transmitted. Thus, the scheduler has the flexibility to change the multiplexing scheme within the bounds given by the nominal resource sets and will also schedule URLLC traffic for the first TTI in the nominal resource set for numerology scheme 3. As a result, the scheduler will make use of all possible radio resources associated to numerology scheme 3 (serving the URLLC service), in detriment of the remaining numerology schemes 1 and 2 for which less radio resources are available than in the previous 0.5 ms time period. Similarly, the scheduler may decide to use more radio resources for numerology scheme 1 (for transmitting data for the mMTC traffic), allocating corresponding shared radio resources to numerology schemes 1 rather than numerology scheme 2. The resulting multiplexing scheme of the numerologies thus significantly changes, as apparent from FIG. 8.

In general, the scheduler can dynamically configure how the different numerologies are multiplexed at different time instances by correspondingly performing the radio resource allocation procedure respectively within the radio resources according to the nominal resource sets and based on the TTI of the respective numerology schemes. The usage of shared radio resources for one or another numerology scheme can change depending on the respective scheduling time intervals.

The two possible multiplexing schemes as shown in FIG. 8 are merely an example, and radio resources may be allocated by the scheduler within the limits given by the nominal resource sets of the respective numerology schemes. However, the sharing of the radio resources between the different numerology schemes need not change at each possible TTI. This for instance depends on whether the traffic situation changes or not. The scheduler has the possibility to change how the numerology schemes actually multiplex e.g. at each TTI, but can also decide to basically maintain the same relative amount of resource splitting as before. During the resource allocation procedure, the scheduler should—if possible—not allocate the same radio resources according to different numerology schemes so as to avoid interference between various transmissions using that radio resources. Nevertheless, this is not strictly necessary, and it is up to the scheduler implementation whether the same radio resources can/should be allocated according to different numerologies (e.g. to different UEs). For the advanced UE with interference cancellation capability, the scheduler might use the overlapping transmission in order to improve the resource utilization.

The bigger the overlapping areas of the nominal resource sets for the different numerology schemes, the more flexible the scheduler can allocate radio resources to the different services based on the different numerology schemes and their TTIs as currently needed. FIG. 9 shows an extreme case where the nominal resource sets of all numerology schemes comprise all available radio resources and thus all fully overlap each other. As illustrated in the upper part of FIG. 9, all resources are shared by the three numerology schemes, and the scheduler is fully flexible on how to multiplex the different numerologies in the system. Consequently, multiplexing schemes such as those illustrated in FIGS. 6 to 8 are possible, and many more.

However, it should be noted that low complexity UEs might not be able to process the whole bandwidth of the frequency band, as assumed for the three nominal resource sets of FIG. 9, since e.g. the FFT/IFFT size is limited by the UE's processing capability. Correspondingly, it is questionable whether it makes sense to extend the nominal resource set over the whole system bandwidth, particularly for a numerology scheme suitable for low-complexity UEs. Furthermore, as will be explained later, using smaller nominal resource sets (such as the ones defined for FIG. 8) has the benefit that less information needs to be transmitted for indicating the allocated radio resources. Consequently, when defining nominal resource sets there is a trade-off between large overlapping resource areas so as to increase flexibility of the radio resource allocation and only small nominal resource sets so as to allow for a simpler resource allocation indication.

Furthermore, by restricting the nominal resource sets e.g. in the frequency domain, it is possible to achieve a lower FFT/IFFT complexity, and might also allow the hopping of the FFT/IFFT window position. For example, as illustrated in FIG. 7, mMTC UEs can be configured with a nominal resource set consisting of upper and lower portions of the frequency band. Then, the UE's FFT window size for receiving data can be set according to one of these two portions, but the position of the FFT window is hopped between these two portions according to a pattern that is preconfigured and understood by both UEs and scheduler. In this way, frequency diversity can be achieved. Restricting the nominal resource sets in the frequency domain also depends on the frequency bandwidth requirements of a particular service, such that restricting the nominal resource set to only a portion of the system frequency bandwidth is suitable for a numerology layer with a small subcarrier spacing and/or narrow bandwidth requirements such as mMTC.

In order to further increase the flexibility of the overall system, particularly when using small nominal resource sets, further implementations of the first embodiment provide the possibility to regularly redefine the nominal resource sets of one or more numerology schemes. The currently defined nominal resource sets provide a limit as to how much the scheduler is able to react to changing traffic situations of the various services. By providing the possibility of redefining the nominal resource sets of different numerology schemes on a regular basis, it is possible to react to changing traffic situations of the various services without such limits, albeit possibly on a slower timescale than a given by the TTIs of the numerology schemes. The combination of using both nominal set configuration and TTI level resource allocation provides a mechanism to adapt to the traffic variation at two timescales. The slow traffic variation can be taken into account by reconfiguring the nominal resource set, while the fast traffic variation can be accommodated by changing the resource allocation per TTI. In the situation where traffic is only changing slowly over time, the same resource scheduling information can be used for multiple TTIs (e.g., semi-persistent scheduling), resulting in a reduced scheduling signaling overhead.

As discussed above, according to the exemplary scenarios assumed above, the UE supports at least one of the various numerology schemes, and thus it should be made aware of the definition of the nominal resource set of the one or more numerology scheme(s) it supports in order to be able to transmit and receive data and control information via the radio resources of the nominal resource set. The necessary information on the nominal resource set for the numerology scheme the UE supports can be provided to the UE e.g. as part of the Master Information Block (MIB) or as part of a System Information Block (SIB) broadcasted by a radio base station in its radio cell. The necessary information may identify the corresponding time-frequency radio resources that belong to that nominal resource set e.g. the frequency location relative to the position of MIB/SIB and the frequency bandwidth, and in the time domain the available symbols/TTIs within a certain time duration (e.g. spanning a certain number of TTIs). The time-frequency radio resources can be indicated based on the characteristics of the corresponding numerology scheme, e.g. identifying the resource scheduling units defined by the numerology scheme.

UEs support one or more numerology schemes, and thus perform reception and transmission according to the supported numerology schemes and within the radio resources as indicated by the corresponding nominal resource sets.

In order for the UEs to be informed about resource allocation decisions made by the scheduler, a similar approach as already known from LTE could be used. In particular, a control information region (can also be denoted Downlink Control Information (DCI) search space) can be defined, such that part of these radio resources can then be used by the scheduler (e.g. radio base station) to transmit control information such as the resource allocation information to the UEs. Correspondingly, each UE should monitor respective control information region(s) in order to see whether control information is present that is actually destined to itself.

In general, there are two possibilities for defining the particular control information regions. According to one option, the control information is transmitted in the same numerology scheme as the data for which the control information is transmitted. This option is particularly suitable for UEs that support only one numerology scheme. Furthermore, for UEs that support multiple services and respective numerology schemes, it is simple to meet the latency requirements by having individual DCI transmissions for each numerology scheme and traffic type. However, the definition of various control information regions increases the blind decoding effort on the UE side.

On the other hand, in order to reduce the blind decoding effort, a common control information region can be defined as an alternative option, such that for one or more of the numerology schemes, the corresponding control information may be transmitted according to another numerology scheme than the data for which the control information is transmitted.

Figure 10:
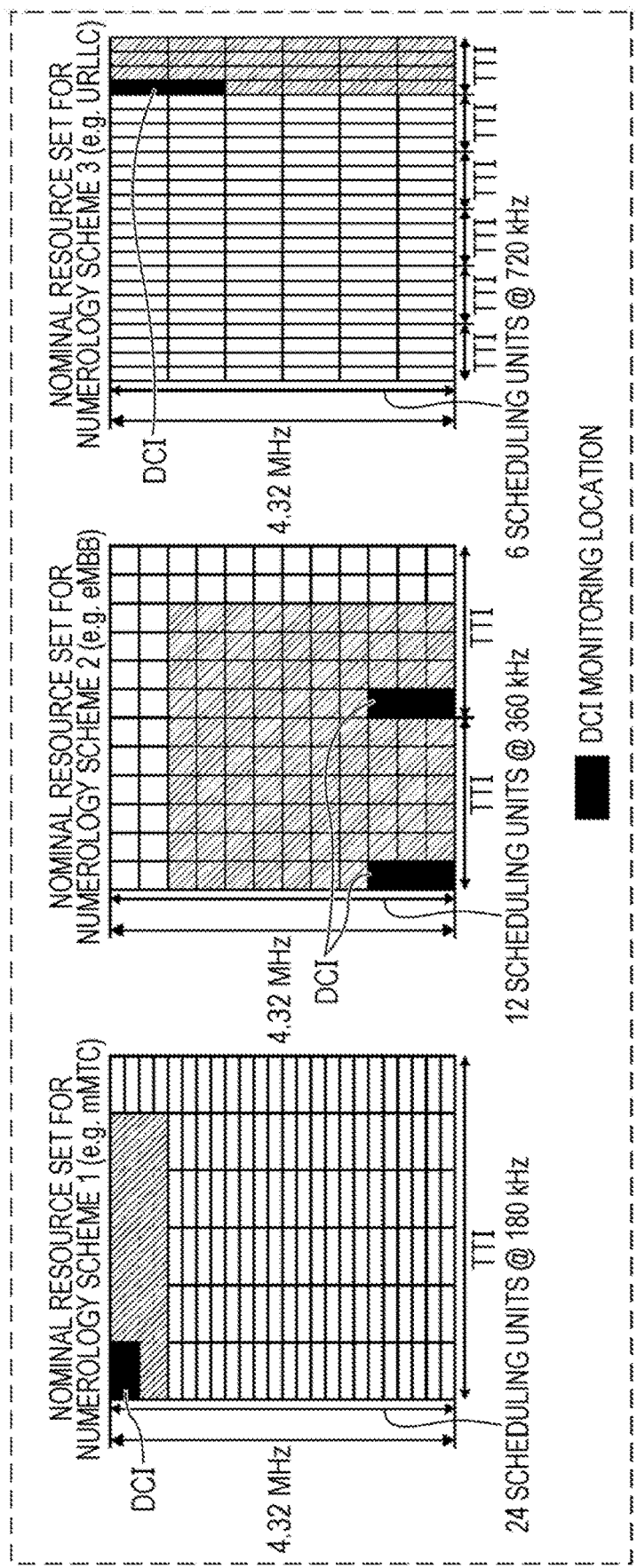
FIG. 10 illustrates nominal resource sets defined for the three numerology schemes of FIG. 5 and possible DCI monitoring location in the nominal resource set of each numerology scheme, according to an exemplary implementation of the first embodiment.
Figure 11:
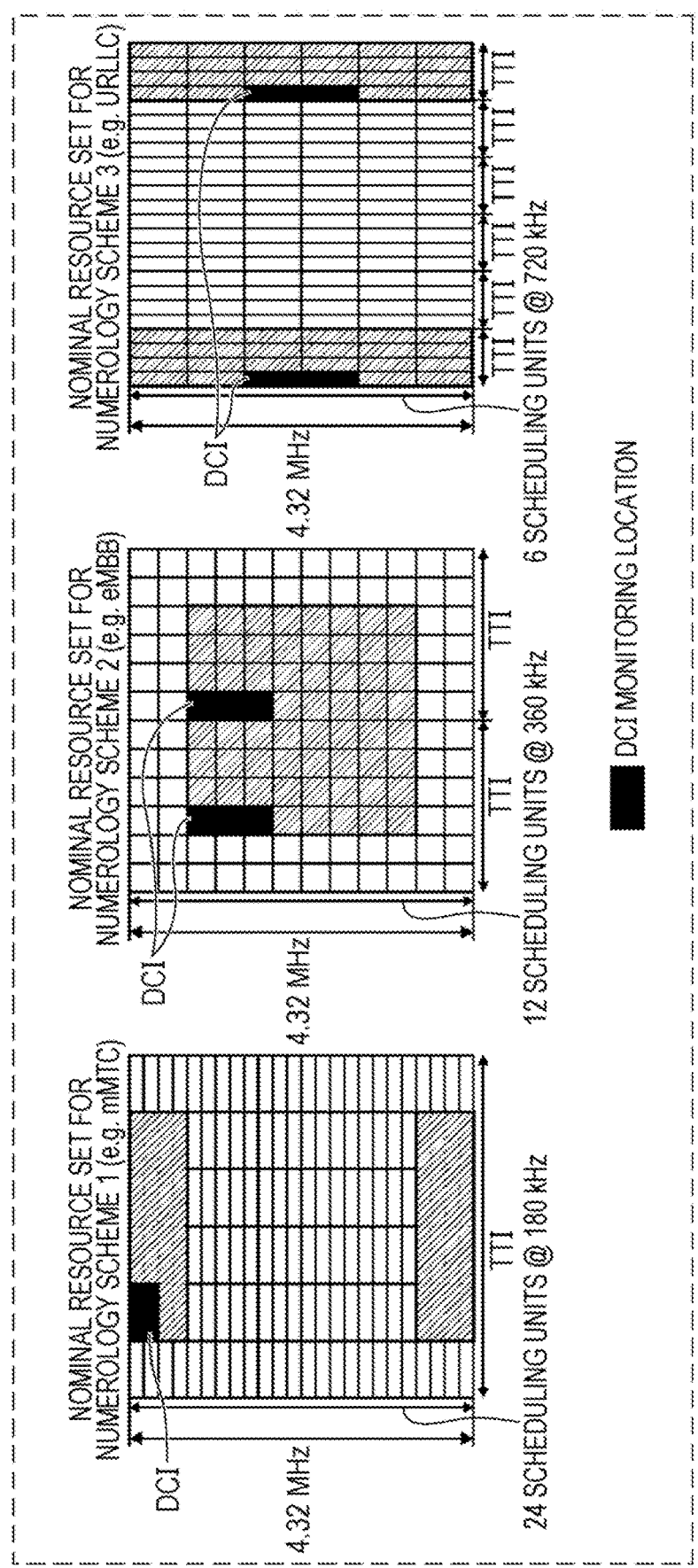
FIG. 11 illustrates nominal resource sets defined for the three numerology schemes of FIG. 5 and possible DCI monitoring location in the nominal resource set of each numerology scheme, according to an exemplary implementation of the first embodiment.

The control information region (DCI search space) can be defined for instance as illustrated in FIGS. 10 and 11, where DCI search spaces are defined per numerology scheme within the corresponding radio resources of the nominal resource set, so as to allow control information to be transmitted to the UE in time for scheduling the UE according to the TTI of the numerology scheme. Consequently, control information is always transmitted to the UEs in accordance with the numerology scheme to which it pertains and according to which the data is also transmitted. The DCI search spaces should be defined within each nominal resource set so as to allow that all radio resources can indeed be scheduled, i.e. for each TTI. Therefore, for the nominal resource set of numerology schemes 2 and 3, respectively two DCI monitoring locations are defined, one per TTI.

Figure 12:
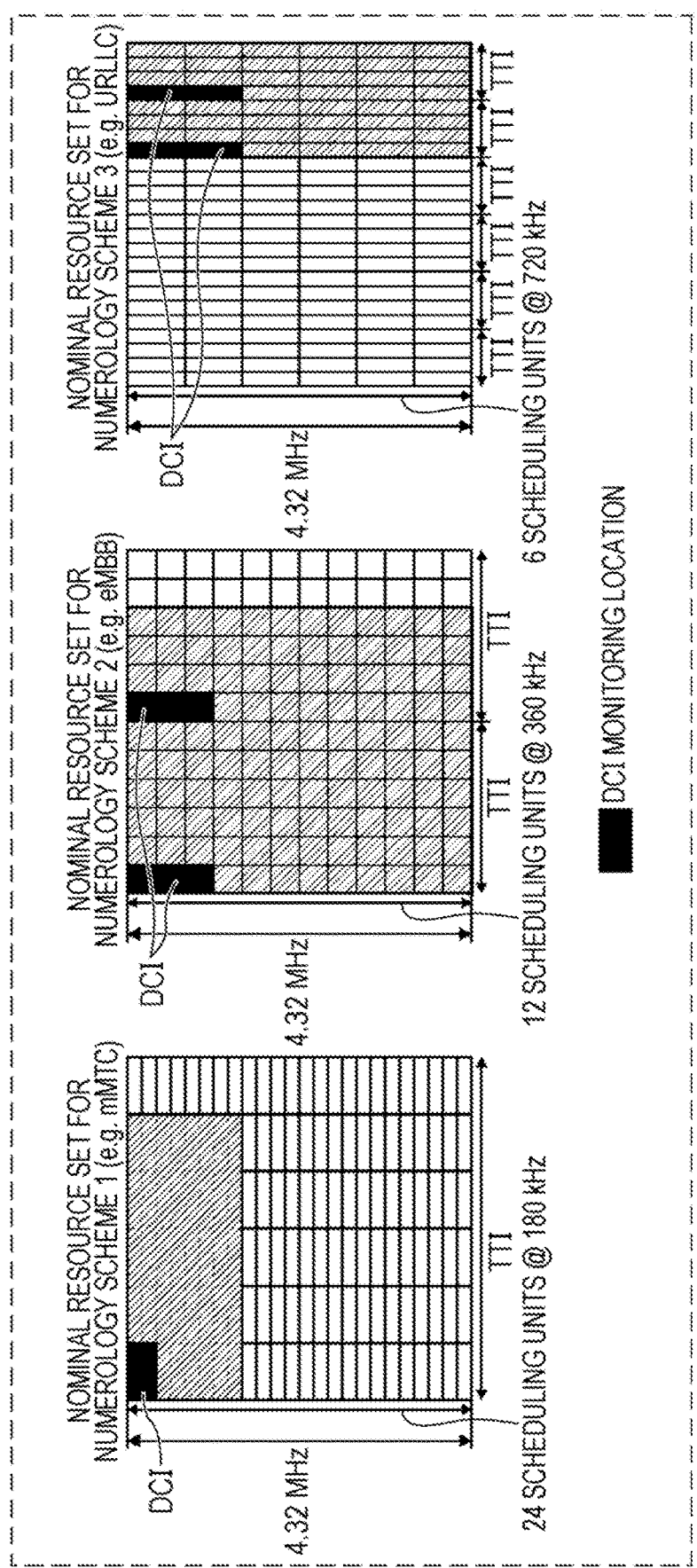
FIG. 12 illustrates nominal resource sets defined for the three numerology schemes of FIG. 5 and possible DCI monitoring location in the nominal resource set of each numerology scheme, according to an exemplary implementation of the first embodiment.

According to further implementations of the first embodiment, the DCI search spaces of the different numerology schemes can overlap as well. This is illustrated in FIG. 12, which is based on the overlapping nominal resource sets as defined and explained in connection with FIG. 8. As apparent therefrom, the DCI search space for numerology scheme 1 and the DCI search space for the first TTI of numerology scheme 2 share some radio resources. Correspondingly, the scheduler can use these shared radio resources of the DCI search spaces either for transmitting control information for numerology scheme 1 or numerology scheme 2 as needed. Nevertheless, the DCI search spaces having shared radio resources should be defined in such a manner so as to also allow simultaneous scheduling of data transmissions for both numerology schemes at the same time, e.g. the actual transmission of a DCI message in the first TTI of numerology scheme 2 only uses part of the reserved frequencies for the numerology-2-DCI search space.

Furthermore, as also apparent from FIG. 12, radio resources of the DCI search space for numerology scheme 2 (see first TTI or second TTI of numerology scheme 2) correspond to radio resources that are available for data transmissions according to numerology scheme 1, and vice versa. The same applies to radio resources of the DCI search space for numerology scheme 3 (see fifth TTI for numerology scheme 3), that correspond to radio resources that are available for the data transmissions in either numerology scheme 1 or 2. Correspondingly, the actual usage of such shared radio resources is up to the scheduler; depending on whether the radio resources are needed for transmitting control information or not, the scheduler can use the radio resources associated with the DCI search space of one numerology scheme for allocating data transmissions according to another numerology scheme. There is no need to inform the UE, since even if a UE attempts to decode control information in radio resources allocated by the scheduler for data transmissions, it will simply fail.

Figure 13:
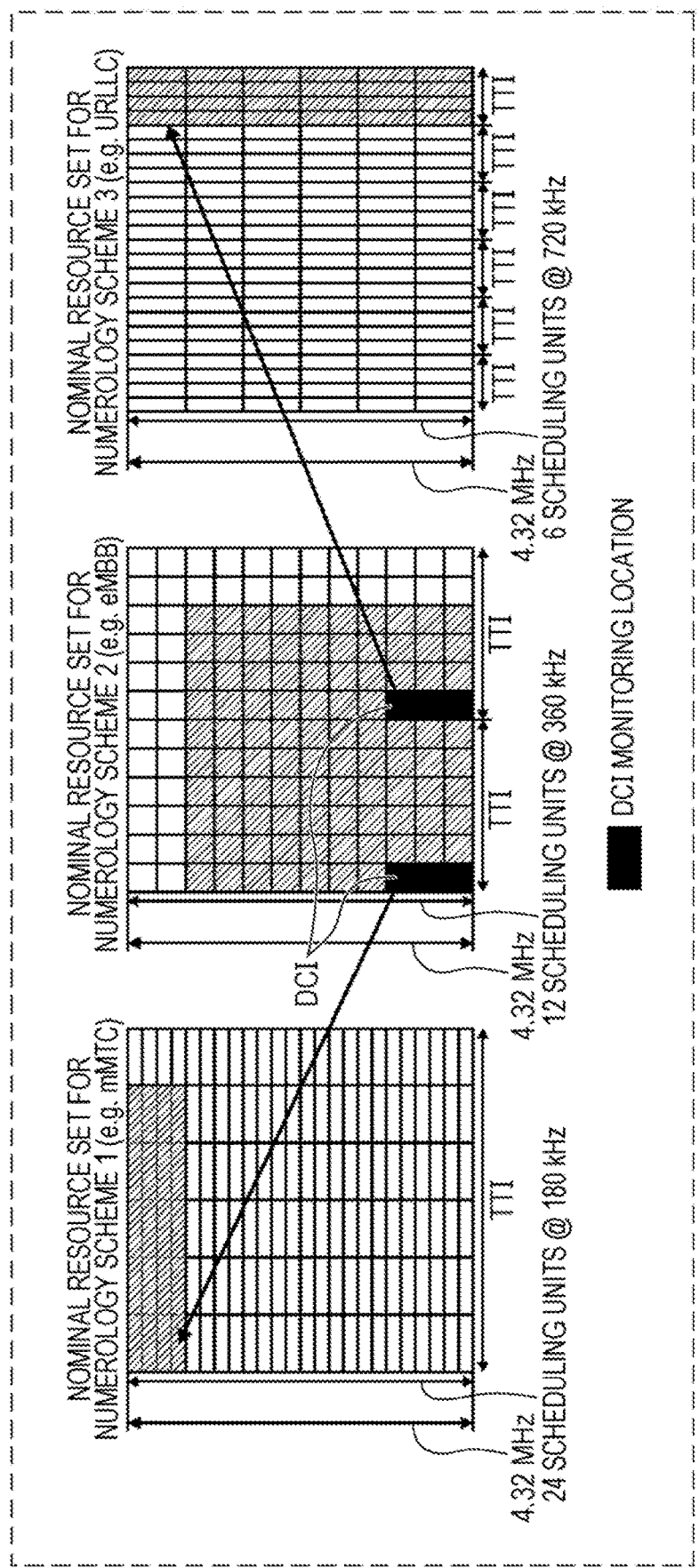
FIG. 13 illustrates nominal resource sets defined for the three numerology schemes of FIG. 5 and a common DCI monitoring location in the nominal resource of one numerology scheme, according to an exemplary implementation of the first embodiment.
Figure 14:
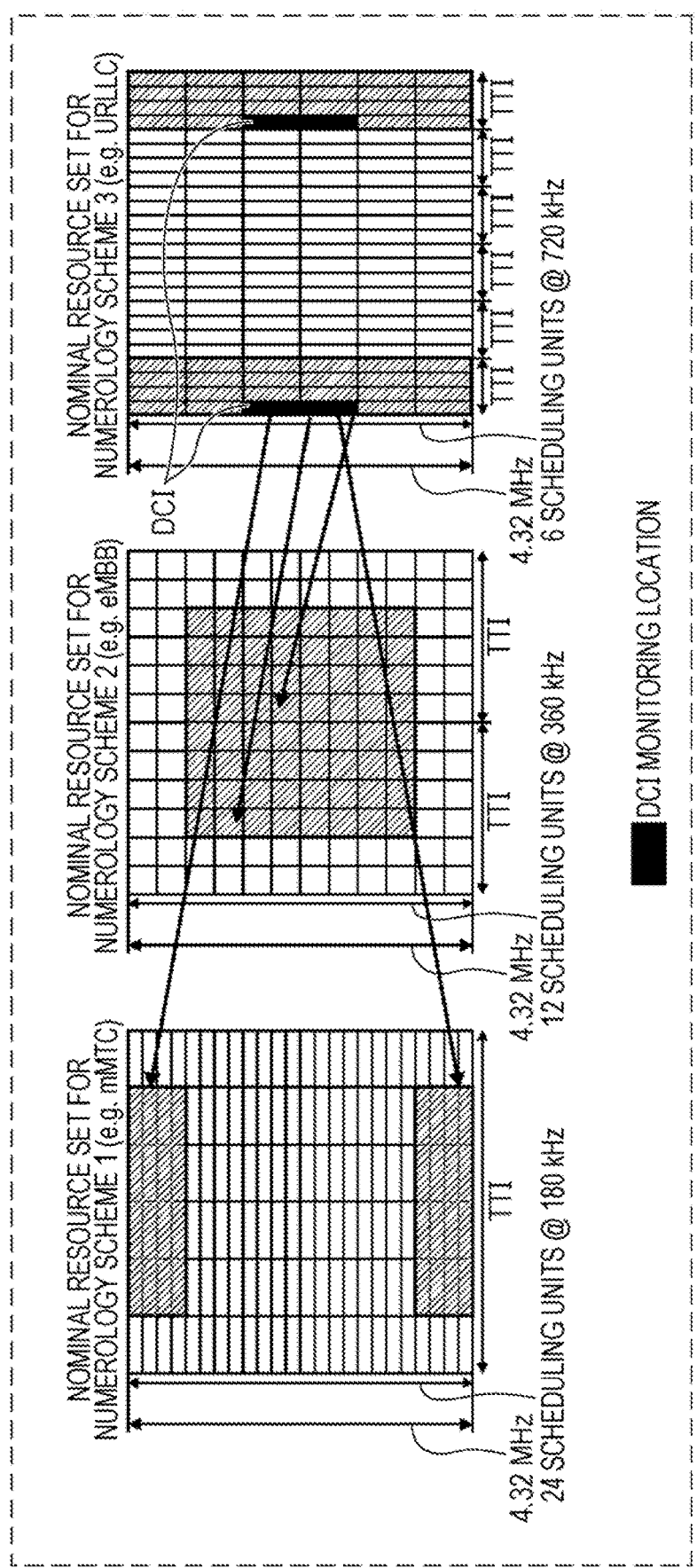
FIG. 14 illustrates nominal resource sets defined for the three numerology schemes of FIG. 5 and a common DCI monitoring location in the nominal resource of one numerology scheme, according to an exemplary implementation of the first embodiment.

Alternatively, numerology-common control information regions can be defined so as to reduce the blind decoding effort, as will be exemplary explained in connection with FIGS. 13 and 14. In FIG. 13 DCI search spaces are defined in the nominal resource set defined for numerology scheme 2 which can also be used to transport control information also for allocating radio resources according to numerology schemes 1 and 3 (see corresponding arrows in FIG. 13). For nominal radio resource sets as defined in FIG. 14, numerology-common control information regions can be defined within the nominal resource set of numerology scheme 3, where the first DCI search space (in the first TTI of numerology scheme 3) can be used by the radio base station to transmit necessary resource allocation information for allocating radio resources according to numerology schemes 1 and 2 (again, corresponding arrows show this inter-numerology-scheme resource allocation). In such case, UEs supporting multiple numerologies can monitor one search space for possible DCI messages for any numerology scheme.

The various UEs need to be informed about the radio resources of the DCI search spaces where it should monitor for control information according to any of the numerology schemes that it supports. The DCI search spaces of the various numerology schemes can be e.g. broadcast as system information in a corresponding system information block, or dedicated RRC messages can be used to transport that information from the radio base station to the UE(s). Following the definitions of the DCI search spaces, the UE shall monitor corresponding radio resources according to the supported numerology schemes and perform blind decoding in these resources of the DCI search space(s).

According to further implementations of the first embodiment, blind decoding is not only foreseen for decoding control information but may also be applied to decode data. In particular, a data transmission without DCI is also possible by UE blindly detecting the data. Some small data burst like URLLC or uplink RACH-less transmission for mMTC (transmit small uplink packet without obtaining uplink sync) may be directly transmitted without a corresponding resource allocation (furthermore HARQ might not be supported). Consequently, the resource set defined for the corresponding numerology scheme for the URLLC data is considered the search space for the blind decoding of the data. In order to facilitate the blind decoding, it can be foreseen that only particular coding rates and/or modulation schemes are used for such URLLC data transmissions. Since no scheduling process is needed and no resource allocation information is transmitted, the transmission latency can be further reduced and the signaling overhead as well.

The resource allocation information that is transmitted by the scheduler using radio resources in the corresponding DCI search spaces is provided in accordance with the characteristics of the numerology scheme. Furthermore, the radio resources can also be indicated with reference to the nominal resource set. Consequently, the indications of the allocated radio resources according to the different numerology schemes (and the different nominal resource sets) are decoupled from one another. Moreover, by providing a small nominal resource set, the indications of the allocated radio resources are simple since less radio resources need to be distinguished for the resource indication.

In the above explanations of the numerology schemes, no distinction was made as to whether it would pertain to the uplink or downlink. According to implementations of the first embodiment, the same numerology scheme can be used for the uplink and downlink directions, and thus correspondingly for the transmission and reception of uplink and downlink data. Correspondingly, the radio resource allocation procedure in said respect stays also the same irrespective of whether uplink or downlink transmissions are scheduled. On the other hand, neither the numerology scheme nor the resource allocation needs to stay the same for the uplink and downlink. Rather, different numerology schemes can be applied for the same service for the uplink or downlink. For instance, the mMTC service is known to require an extended coverage in the uplink (which may not be feasible for the downlink) and thus can use a different numerology scheme having e.g. a small subcarrier spacing (e.g. 3.75 kHz) and thus a long symbol duration so as to fulfill this coverage requirement.

Figure 15:
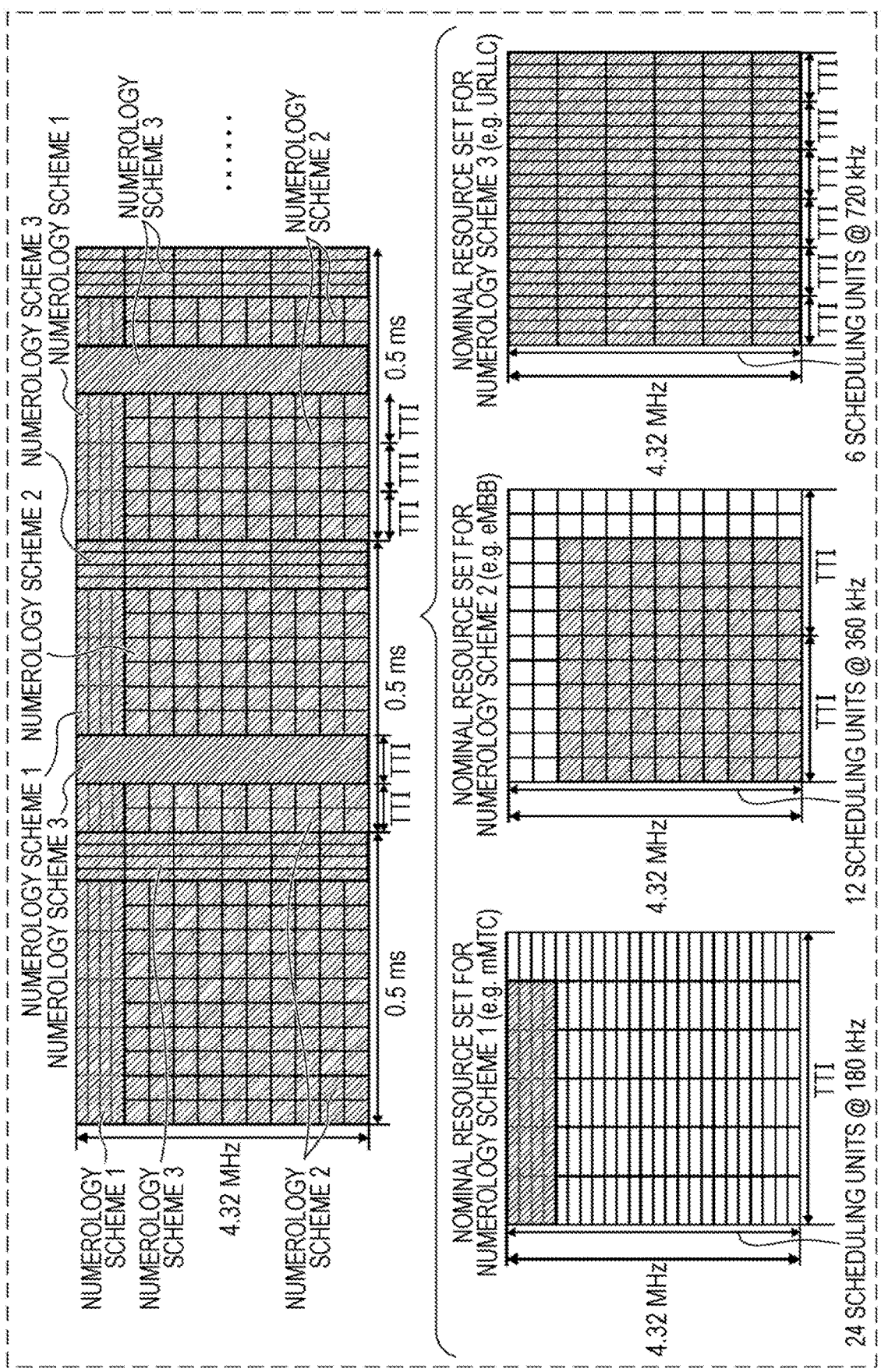
FIG. 15 illustrates a multiplexing of the three numerology schemes of FIG. 5, and the overwriting of previously allocated radio resources of numerology schemes 1 and 2 for the purpose of allocating radio resources for numerology scheme 3, but as a shorter scheduling time interval.

Further implementations of the first embodiment allow the scheduler to accommodate high-priority traffic (e.g. having extremely low latency; i.e. having a shorter TTI) for one numerology scheme even after having performed the scheduling allocation for another numerology scheme. FIG. 15 in said connection illustrates how traffic of numerology scheme 3 can be accommodated within the radio resource already allocated according to numerologies 1 and 2. This improvement is particularly useful for traffic with very short latency requirements, such as the URLLC traffic.

In particular, a similar scenario as explained in connection with FIG. 6 is assumed, including the definition of the nominal resource sets for each numerology scheme as illustrated at the lower part of FIG. 15. As apparent from FIG. 15, the nominal resource set for the URLLC traffic thus provide full flexibility and allows the scheduler to schedule radio resources for the URLLC traffic at each TTI. A corresponding multiplexing result obtained during the resource allocation is illustrated at the upper left part of FIG. 15 and corresponds to the one in FIG. 6. In particular, the resource allocation procedure allocates the resources to numerology schemes 1 and 2 at the respective first TTI, as illustrated for the first 0.5 ms time period. However, at the upper middle part of FIG. 15 (i.e. the second 0.5 ms time period), it is assumed that urgent URLLC traffic needs to be allocated already at the second TTI of numerology scheme 3). At this point, the scheduler has however already allocated the radio resources according to numerology schemes 1 and 2, and the corresponding radio resources are scheduled to be used for transmitting data according to numerology schemes 1 and 2. URLLC traffic shall typically be served with the highest priority so as to achieve the required extremely low latency. Consequently, it should be possible to schedule URLLC transmissions even in the middle of already allocated long scheduling intervals (TTIs) for the other services (i.e. eMBB and mMTC) (i.e. even after radio resource allocation already occurred for the other services). Therefore, it should be possible to reallocate radio resources that already have been allocated according to another numerology scheme to the numerology scheme 3 having the shorter TTI for the URLLC to fulfill the low latency requirements.

There are different possibilities on how to achieve this. One option would be to puncture radio resources of the other numerology schemes at those radio resources that are suddenly being allocated to the numerology scheme 3 for the URLLC traffic. Correspondingly, the urgent URLLC data overwrites the eMBB and mMTC data in the corresponding radio resources of the respective numerology schemes 1 and 2, as apparent from FIG. 15. Therefore, at the punctured radio resources, rather than transmitting the data of the eMBB and mMTC services, the URLLC traffic data is transmitted. Due to the puncturing, the performance for the transmission of the mMBB and mMTC traffic is degraded. Optionally, the procedure may be improved by informing the affected UEs of the puncturing operation (e.g. by the scheduler broadcasting corresponding information) such that the decoding of the punctured data is improved since the UE correspondingly ignores the overwritten bits (that belong to the other URLLC traffic).

According to a further improvement, rate matching may be used for accommodating the allocation of radio resources for the URLLC traffic. In particular, again the radio resources of numerology schemes 1 and 2 are punctured as illustrated in FIG. 15. In addition however, rate matching is performed for the remaining transmission according to numerology schemes 1 and 2, thereby achieving to transmit the overwritten data in the remaining resources available for the numerology schemes 1 and 2 (albeit by using a higher coding rate). Moreover, the affected UEs should be informed about the resources wherein this overwriting of data occurs (e.g. by a broadcast from the scheduler) and should be aware of the rate matching process performed at the transmitting side such that they are able to properly decode the rate-matched data using the changed coding rate over the correct resources.

According to another solution, instead of overwriting data in previously allocated radio resources of other numerology schemes, a suitable amount of radio resources can be reserved from the very beginning that may then be used as needed in such situations. Specifically, for predictable URLLC traffic, the radio resource allocation performed for the numerology schemes 1 and 2 can take into account potential URLLC traffic transmission at e.g. the second TTI of nominal resource set for numerology 3 and will thus not allocate those radio resources for the transmission of eMBB and mMTC data. Correspondingly, resource allocation information transmitted for the mMTC and eMBB traffic should indicate those radio resources that are reserved for the possible transmission of the URLLC traffic and that are not to be used for transmitting data according to numerology schemes 1 and 2. For instance, a bit mapping indication can be provided, where each bit can be associated to one of the symbols within the radio resource sets of the other numerology schemes 1 and 2. A bit map for numerology scheme 1 of 5 bits for each symbol of the nominal resource set of numerology scheme 1 would thus indicate 01000, thereby reserving the second symbol of numerology scheme 1 for the potential transmission of the URLLC traffic. Correspondingly, a bitmap for numerology scheme 2 of 10 bits for each symbol of the nominal resource set of numerology scheme 2 would thus indicate 0011000000, reserving the third and fourth symbol of that numerology scheme for the potential transmission of the URLLC traffic. Instead of using a bitmap, the reservation of radio resources can also be implemented by only indicating the beginning symbol and the length of a contiguous reservation. Although this is less flexible than using a bitmap, it might use fewer bits for the reservation indication in the resource allocation information.

Figure 16:
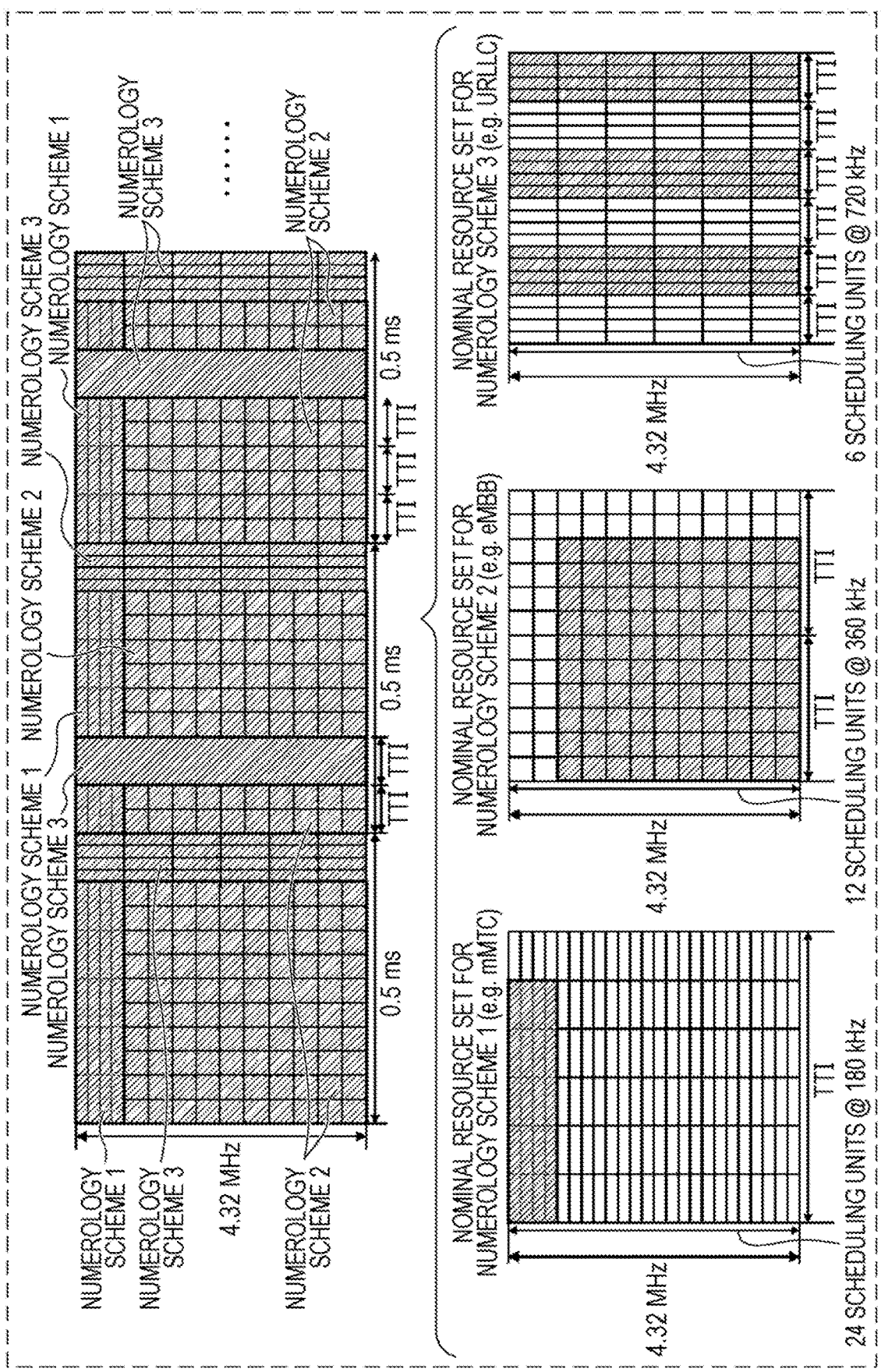
FIG. 16 illustrates a multiplexing of the three numerology schemes of FIG. 5, and the overwriting of previously allocated radio resources of numerology schemes 1 and 2 for the purpose of allocating radio resources for numerology scheme 3, but as a shorter scheduling time interval.

In order to deal with periodic URLLC traffic, the nominal resource set could also be redefined accordingly such that only every second TTI is available for the URLLC traffic according to numerology scheme 3. This is illustrated in connection with FIG. 16. Correspondingly, by spacing the nominal resource set for the URLLC traffic, even when URLLC traffic could be theoretically transmitted at a TTI that is not available for being scheduled according to numerology 3, only a short latency is introduced by having to wait to the next TTI. On the other hand, the signaling overhead of DCI for reserving resources from numerology schemes 1 and 2 is reduced since the reservation only needs to consider a reduced size of URLLC nominal set. For example, at the beginning of numerology 1 TTI, the bit mapping for reserving resources only needs 2 bits instead of 5 as previously described in FIG. 15.

Further Embodiments

According to a first aspect, a method is provided for allocating time-frequency radio resources by a scheduler in a mobile communication system. A plurality of numerology schemes are defined, each partitioning a plurality of time-frequency radio resources of the mobile communication system into resource scheduling units in a different manner. A reference resource set is defined per numerology scheme, each reference resource set being associated to a set of time-frequency radio resources that are usable for being allocated according to the respective numerology scheme. The reference resource set of at least one numerology scheme overlaps with the reference resource set of at least another numerology scheme in the frequency domain and/or time domain. The method comprises performing by the scheduler a resource allocation procedure for allocating time-frequency radio resources to one or more user terminals according to the plurality of numerology schemes. The resource allocation procedure is performed for each numerology scheme based on a scheduling time interval defined for the respective numerology scheme.

According to a second aspect which is provided in addition to the first aspect, the resource allocation procedure is performed such that the plurality of numerology schemes are multiplexed across the plurality of time-frequency radio resources in a time domain and/or a frequency domain based on the respective reference resource sets without overlapping each other in the time domain or frequency domain. As an option, the reference resource set of a numerology scheme sets a limit to the radio resources that can be allocated during the resource allocation procedure according to the respective numerology scheme.

According to a third aspect which is provided in addition to one of the first to second aspects, the reference resource set of a numerology scheme is associated either with a fraction of the plurality of time-frequency radio resources or with all of the plurality of time-frequency radio resources. Optionally, the fraction of the plurality of time frequency radio resources is composed of contiguous or non-contiguous frequencies and/or time periods. Optionally, the overlapping of one reference resource set with another reference resource set is partial or full.

According to a fourth aspect in addition to one of the first to third aspects, the partitioning of the plurality of time-frequency radio resources according to a numerology scheme differs from the partitioning of the plurality of time-frequency radio resources according to another numerology scheme at least in one of the following numerology characteristics:

a subcarrier spacing, defining the frequency distance between two contiguous sub-carriers, and a symbol duration, the number of subcarriers per resource scheduling unit, and the number of symbols per resource scheduling unit.

Optionally, the numerology characteristics for a numerology scheme are determined such that requirements of a particular user service are fulfilled.

According to a fifth aspect in addition to one of the first to fourth aspects, information on the reference resource set for each numerology scheme is broadcast by the scheduler. Optionally, the reference resource set for each numerology scheme is configured in a semi-statically manner.

According to a sixth aspect in addition to one of the first to fifth aspects, the plurality of numerology schemes applies to an uplink transmission scheme and/or a downlink transmission scheme.

According to the seventh aspect in addition to one of the first to sixth aspects, for each numerology scheme, at least one control information region is defined within the reference resource set of the respective numerology scheme. Time-frequency radio resources of the control information region are usable by the scheduler to transmit resource allocation information to user terminals allocating radio resources for a data transmission according to the respective numerology scheme. Optionally, the control information region of at least one numerology scheme overlaps the control information region of at least one other numerology scheme. Optionally, the time-frequency radio resources of the control information region of one numerology scheme are usable for being allocated for a data transmission according to another numerology scheme. Optionally, a user terminal monitors the control information region of each of the one or more numerology schemes supported by the user terminal so as to receive resource allocation information destined to the user terminal. Optionally, information on the control information region of the plurality of numerology schemes is transmitted by the scheduler to the user terminals.

According to eighth aspect in addition to one of the first to sixth aspects, a common control information region is defined within the reference resource set of one of the plurality of numerology schemes. Time-frequency radio resources of the common control information region are usable by the scheduler to transmit resource allocation information to user terminals allocating radio resources for a data transmission according to at least another numerology scheme.

According to ninth aspect in addition to one of the first to eighth aspects, after performing the resource allocation procedure for a first numerology scheme, time frequency radio resources allocated according to the first numerology scheme are re-allocated according to a second numerology scheme having a shorter scheduling time interval than the first numerology scheme by:

overwriting the time-frequency radio resources allocated according to the first numerology scheme, optionally wherein information on the overwritten time-frequency radio resources is broadcast by the scheduler, or overwriting the time-frequency radio resources allocated according to the first numerology scheme, and additionally performing rate matching for the subsequent time frequency radio resources allocated according to the first numerology scheme, optionally wherein information on the overwritten time-frequency radio resources is broadcast by the scheduler.

According to tenth aspect in addition to one of the first to ninth aspects, resource allocation information for time-frequency radio resources allocated according to a first numerology scheme indicates reserved time-frequency radio resources that are reserved within the allocated time-frequency radio resources for being allocated according to a second numerology scheme having a shorter scheduling time interval than the first numerology scheme.

According to eleventh aspect, a method is provided for a user terminal receiving resource allocation information from a scheduler which allocates time-frequency radio resources in a mobile communication system. A plurality of numerology schemes are defined, each partitioning a plurality of time-frequency radio resources of the mobile communication system into resource scheduling units in a different manner. A reference resource set is defined per numerology scheme, each reference resource set being associated to a set of time-frequency radio resources that are usable for being allocated according to the respective numerology scheme. The reference resource set of at least one numerology scheme overlaps with the reference resource set of at least another numerology scheme in the frequency domain and/or time domain. The resource allocation procedure is performed by the scheduler for allocating time frequency radio resources to one or more user terminals according to the plurality of numerology schemes. The resource allocation procedure is performed by the scheduler for each numerology scheme based on a scheduling time interval defined for the respective numerology scheme. The method comprises the step performed by the user terminal of receiving resource allocation information about the radio resources allocated by the scheduler to the user terminal.

According to a twelfth aspect in addition to the eleventh aspect, the resource allocation procedure is performed by the scheduler such that the plurality of numerology schemes are multiplexed across the plurality of time-frequency radio resources in a time domain and/or a frequency domain based on the respective reference resource sets without overlapping each other in the time domain or frequency domain. Optionally, the reference resource set of a numerology scheme sets a limit to the radio resources that can be allocated during the resource allocation procedure according to the respective numerology scheme.

According to a thirteenth aspect provided in addition to the eleventh or twelfth aspect, the reference resource set of a numerology scheme is associated either with a fraction of the plurality of time-frequency radio resources or with all of the plurality of time-frequency radio resources. Optionally, the fraction of the plurality of time frequency radio resources is composed of contiguous or non-contiguous frequencies and/or time periods. Optionally, the overlapping of one reference resource set with another reference resource set is partial or full.

According to a fourteenth aspect provided in addition to one of the eleventh to thirteenth aspects, the partitioning of the plurality of time-frequency radio resources according to a numerology scheme differs from the partitioning of the plurality of time-frequency radio resources according to another numerology scheme at least in one of the following numerology characteristics:

a subcarrier spacing, defining the frequency distance between two contiguous subcarriers, and a symbol duration, the number of subcarriers per resource scheduling unit, and the number of symbols per resource scheduling unit, Optionally, the numerology characteristics for a numerology scheme are determined such that requirements of a particular user service are fulfilled.

According to a fifteenth aspect provided in addition to one of the eleventh to fourteenth aspects, information on the reference resource set for each numerology scheme is received through a broadcast made by the scheduler. Optionally, the reference resource set for each numerology scheme is configured in a semi-statically manner.

According to a sixteenth aspect provided in addition to one of the eleventh to fifteenth aspects, for each numerology scheme, at least one control information region is defined within the reference resource set of the respective numerology scheme. Time-frequency radio resources of the control information region are usable by the scheduler to transmit resource allocation information to user terminals allocating radio resources for a data transmission according to the respective numerology scheme. Optionally, the control information region of at least one numerology scheme overlaps the control information region of at least one other numerology scheme. Optionally, the time-frequency radio resources of the control information region of one numerology scheme are usable for being allocated for a data transmission according to another numerology scheme. Optionally, the user terminal monitors the control information region of each of the one or more numerology schemes supported by the user terminal so as to receive resource allocation information destined to the user terminal. Optionally, information on the control information region of the plurality of numerology schemes is transmitted by the scheduler to the user terminal.

According to a seventeenth aspect provided in addition to one of the eleventh to fifteenth aspects, a common control information region is defined within the reference resource set of one of the plurality of numerology schemes. Time-frequency radio resources of the common control information region are usable by the scheduler to transmit resource allocation information to user terminals allocating radio resources for a data transmission according to at least another numerology scheme. The user terminal monitors the common control information region so as to receive resource allocation information destined to the user terminal.

According to an eighteenth aspect, a scheduler is provided for allocating time frequency radio resources in a mobile communication system. A plurality of numerology schemes are defined, each partitioning a plurality of time-frequency radio resources of the mobile communication system into resource scheduling units in a different manner. A reference resource set is defined per numerology scheme, each reference resource set being associated to a set of time-frequency radio resources that are usable for being allocated according to the respective numerology scheme. The reference resource set of at least one numerology scheme overlaps with the reference resource set of at least another numerology scheme in the frequency domain and/or time domain. The scheduler comprises a processor, which in operation, performs a resource allocation procedure for allocating time-frequency radio resources to one or more user terminals according to the plurality of numerology schemes. The resource allocation procedure is performed by the processor for each numerology scheme based on a scheduling time interval defined for the respective numerology scheme.

According to a nineteenth aspect provided in addition to the eighteenth aspect, the resource allocation procedure is performed such that the plurality of numerology schemes are multiplexed across the plurality of time-frequency radio resources in a time domain and/or a frequency domain based on the respective reference resource sets without overlapping each other in the time domain or frequency domain. Optionally, the reference resource set of a numerology scheme sets a limit to the radio resources that can be allocated during the resource allocation procedure according to the respective numerology scheme.

According to a twentieth aspect provided in addition to the eighteenth or nineteenth aspect, the reference resource set of a numerology scheme is associated either with a fraction of the plurality of time-frequency radio resources or with all of the plurality of time-frequency radio resources. Optionally, the fraction of the plurality of time frequency radio resources is composed of contiguous or non-contiguous frequencies and/or time periods. Optionally, the overlapping of one reference resource set with another reference resource set is partial or full.

According to a 21st aspect provided in addition to one of the eighteenth to twentieth aspects, the partitioning of the plurality of time-frequency radio resources according to a numerology scheme differs from the partitioning of the plurality of time-frequency radio resources according to another numerology scheme at least in one of the following numerology characteristics:

a subcarrier spacing, defining the frequency distance between two contiguous subcarriers, and a symbol duration, the number of subcarriers per resource scheduling unit, and the number of symbols per resource scheduling unit.

Optionally, the numerology characteristics for a numerology scheme are determined such that requirements of a particular user service are fulfilled.

According to a 22nd aspect provided in addition to one of the eighteenth to 21st aspects, information on the reference resource set for each numerology scheme is broadcast by the scheduler. Optionally, the reference resource set for each numerology scheme is configured in a semi-statically manner.

According to a 23rd aspect provided in addition to one of the eighteenth to 22nd aspects, the plurality of numerology schemes applies to an uplink transmission scheme and/or a downlink transmission scheme.

According to a 24th aspect provided in addition to one of the eighteenth to 23rd aspects, for each numerology scheme, at least one control information region is defined within the reference resource set of the respective numerology scheme. Time frequency radio resources of the control information region are usable by the scheduler to transmit resource allocation information to user terminals allocating radio resources for a data transmission according to the respective numerology scheme. Optionally, the control information region of at least one numerology scheme overlaps the control information region of at least one other numerology scheme. Optionally, the time frequency radio resources of the control information region of one numerology scheme are usable for being allocated for a data transmission according to another numerology scheme. Optionally, a user terminal monitors the control information region of each of the one or more numerology schemes supported by the user terminal so as to receive resource allocation information destined to the user terminal. Optionally, information on the control information region of the plurality of numerology schemes is transmitted by the scheduler to the user terminals.

According to a 25th aspect provided in addition to one of the eighteenth to 23rd aspects, a common control information region is defined within the reference resource set of one of the plurality of numerology schemes. Time-frequency radio resources of the common control information region are usable by the scheduler to transmit resource allocation information to user terminals allocating radio resources for a data transmission according to at least another numerology scheme.

According to a 26th aspect provided in addition to one of the eighteenth to 25th aspects, after performing the resource allocation procedure for a first numerology scheme, time-frequency radio resources allocated according to the first numerology scheme are re-allocated according to a second numerology scheme having a shorter scheduling time interval than the first numerology scheme by:

overwriting the time-frequency radio resources allocated according to the first numerology scheme, optionally wherein information on the overwritten time-frequency radio resources is broadcast by the scheduler, or overwriting the time-frequency radio resources allocated according to the first numerology scheme, and additionally performing rate matching for the subsequent time frequency radio resources allocated according to the first numerology scheme, wherein information on the overwritten time-frequency radio resources is broadcast by the scheduler.

According to a 27th aspect provided in addition to one of the eighteenth to 26th aspects, resource allocation information for time-frequency radio resources allocated according to a first numerology scheme indicates reserved time-frequency radio resources that are reserved within the allocated time-frequency radio resources for being allocated according to a second numerology scheme having a shorter scheduling time interval than the first numerology scheme.

According to a 28th aspect, a user terminal is provided for receiving resource allocation information from a scheduler which allocates time-frequency radio resources in a mobile communication system. A plurality of numerology schemes are defined, each partitioning a plurality of time-frequency radio resources of the mobile communication system into resource scheduling units in a different manner. A reference resource set is defined per numerology scheme, each reference resource set being associated to a set of time-frequency radio resources that are usable for being allocated according to the respective numerology scheme. The reference resource set of at least one numerology scheme overlaps with the reference resource set of at least another numerology scheme in the frequency domain and/or time domain. The resource allocation procedure is performed by the scheduler for allocating time-frequency radio resources to one or more user terminals according to the plurality of numerology schemes. The resource allocation procedure is performed by the scheduler for each numerology scheme based on a scheduling time interval defined for the respective numerology scheme. The user terminal comprises a receiver, which in operation, receives resource allocation information about the time-frequency radio resources allocated by the scheduler to the user terminal.

According to a 29th aspect provided in addition to the 28th aspect, the resource allocation procedure is performed by the scheduler such that the plurality of numerology schemes are multiplexed across the plurality of time-frequency radio resources in a time domain and/or a frequency domain based on the respective reference resource sets without overlapping each other in the time domain or frequency domain. Optionally, the reference resource set of a numerology scheme sets a limit to the radio resources that can be allocated during the resource allocation procedure according to the respective numerology scheme.

According to a 30th aspect provided in addition to the 28th or 29th aspect, the reference resource set of a numerology scheme is associated either with a fraction of the plurality of time-frequency radio resources or with all of the plurality of time frequency radio resources. Optionally, the fraction of the plurality of time-frequency radio resources is composed of contiguous or non-contiguous frequencies and/or time periods. Optionally, the overlapping of one reference resource set with another reference resource set is partial or full.

According to a 31st aspect provided in addition to one of the 28th to 30th aspects, the partitioning of the plurality of time-frequency radio resources according to a numerology scheme differs from the partitioning of the plurality of time-frequency radio resources according to another numerology scheme at least in one of the following numerology characteristics:

a subcarrier spacing, defining the frequency distance between two contiguous subcarriers, and a symbol duration, the number of subcarriers per resource scheduling unit, and the number of symbols per resource scheduling unit.

Optionally, the numerology characteristics for a numerology scheme are determined such that requirements of a particular user service are fulfilled.

According to a 32nd aspect provided in addition to one of the 28th to 31st aspects, information on the reference resource set for each numerology scheme is received by a receiver through a broadcast made by the scheduler. Optionally, the reference resource set for each numerology scheme is configured in a semi-statically manner.

According to a 33rd aspect provided in addition to one of the 28th to 32nd aspects, for each numerology scheme, at least one control information region is defined within the reference resource set of the respective numerology scheme. Time-frequency radio resources of the control information region are usable by the scheduler to transmit resource allocation information to user terminals allocating radio resources for a data transmission according to the respective numerology scheme. Optionally, the control information region of at least one numerology scheme overlaps the control information region of at least one other numerology scheme. Optionally, the time-frequency radio resources of the control information region of one numerology scheme are usable for being allocated for a data transmission according to another numerology scheme. Optionally, the user terminal monitors the control information region of each of the one or more numerology schemes supported by the user terminal so as to receive resource allocation information destined to the user terminal. Optionally, information on the control information region of the plurality of numerology schemes is transmitted by the scheduler to the user terminal.

According to a 34th aspect provided in addition to one of the 28th to 32nd aspects, a common control information region is defined within the reference resource set of one of the plurality of numerology schemes. Time-frequency radio resources of the common control information region are usable by the scheduler to transmit resource allocation information to user terminals allocating radio resources for a data transmission according to at least another numerology scheme. The user terminal monitors the common control information region so as to receive resource allocation information destined to the user terminal.

In one general aspect, the techniques disclosed here feature a method for a user terminal receiving resource allocation information from a scheduler which allocates time-frequency radio resources in a mobile communication system. A plurality of numerology schemes are defined, each partitioning a plurality of time frequency radio resources of the mobile communication system into resource scheduling units in a different manner. A reference resource set is defined per numerology scheme, each reference resource set being associated to a set of time frequency radio resources that are usable for being allocated according to the respective numerology scheme. The reference resource set of at least one numerology scheme overlaps with the reference resource set of at least another numerology scheme in the frequency domain and/or time domain. The resource allocation procedure is performed by the scheduler for allocating time-frequency radio resources to one or more user terminals according to the plurality of numerology schemes. The resource allocation procedure is performed by the scheduler for each numerology scheme based on a scheduling time interval defined for the respective numerology scheme. The method comprises the step performed by the user terminal of receiving resource allocation information about the radio resources allocated by the scheduler to the user terminal.

In one general aspect, the techniques disclosed here feature a scheduler for allocating time-frequency radio resources by a scheduler in a mobile communication system. A plurality of numerology schemes are defined, each partitioning a plurality of time-frequency radio resources of the mobile communication system into resource scheduling units in a different manner. A reference resource set is defined per numerology scheme, each reference resource set being associated to a set of time-frequency radio resources that are usable for being allocated according to the respective numerology scheme. The reference resource set of at least one numerology scheme overlaps with the reference resource set of at least another numerology scheme in the frequency domain and/or time domain. The scheduler comprises a processor which performs a resource allocation procedure for allocating time-frequency radio resources to one or more user terminals according to the plurality of numerology schemes. The resource allocation procedure is performed by the processor for each numerology scheme based on a scheduling time interval defined for the respective numerology scheme.

In one general aspect, the techniques disclosed here feature a user terminal for receiving resource allocation information from a scheduler which allocates time-frequency radio resources in a mobile communication system. A plurality of numerology schemes are defined, each partitioning a plurality of time frequency radio resources of the mobile communication system into resource scheduling units in a different manner. A reference resource set is defined per numerology scheme, each reference resource set being associated to a set of time frequency radio resources that are usable for being allocated according to the respective numerology scheme. The reference resource set of at least one numerology scheme overlaps with the reference resource set of at least another numerology scheme in the frequency domain and/or time domain. The resource allocation procedure is performed by the scheduler for allocating time-frequency radio resources to one or more user terminals according to the plurality of numerology schemes. The resource allocation procedure is performed by the scheduler for each numerology scheme based on a scheduling time interval defined for the respective numerology scheme. The user terminal comprises a receiver, which in operation, receives resource allocation information about the time-frequency radio resources allocated by the scheduler to the user terminal.

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

What is claimed is:

1. A method for allocating time-frequency radio resources by a scheduler in a wireless communication system, wherein a plurality of numerology schemes are defined, each partitioning a plurality of time-frequency radio resources of the wireless communication system into resource scheduling units in a different manner, the method implemented in the scheduler comprising:

configuring a first reference resource set out of the plurality of time-frequency radio resources, and configuring a second reference resource set out of the plurality of time-frequency radio resources wherein the second reference resource set overlaps with the first reference resource set in at least one of a frequency domain and a time domain;

the first reference resource set defining bounds of schedulable time-frequency radio resources that can be allocated to one or more user equipments (UEs) according to a first numerology scheme out of the plurality of numerology schemes;

the second reference resource set defining bounds of schedulable time-frequency radio resources that can be allocated to one or more UEs according to a second numerology scheme out of the plurality of numerology schemes; and performing a resource allocation procedure for allocating the time-frequency radio resources of the respective reference resource set to the one or more UEs according to the respective numerology scheme.

2. The method according to claim 1, wherein the resource allocation procedure is performed such that the plurality of numerology schemes are multiplexed across the plurality of time-frequency radio resources in a time domain and/or a frequency domain based on the respective reference resource sets without overlapping each other in the time domain or frequency domain.

3. The method according to claim 1, wherein the reference resource set of a numerology scheme is associated either with a fraction of the plurality of time-frequency radio resources or with all of the plurality of time-frequency radio resources, and wherein the fraction of the plurality of time-frequency radio resources is composed of contiguous or non-contiguous frequencies and/or time periods, wherein the overlapping of one reference resource set with another reference resource set is partial or full.

4. The method according to claim 1, wherein the partitioning of the plurality of time-frequency radio resources according to a numerology scheme differs from the partitioning of the plurality of time-frequency radio resources according to another numerology scheme at least in one of the following numerology characteristics:

a subcarrier spacing, defining the frequency distance between two contiguous subcarriers, and a symbol duration, the number of subcarriers per resource scheduling unit, and the number of symbols per resource scheduling unit, wherein the numerology characteristics for a numerology scheme are determined such that requirements of a particular user service are fulfilled.

5. The method according to claim 1, wherein for each numerology scheme, at least one control information region is defined within the reference resource set of the respective numerology scheme, wherein time-frequency radio resources of the control information region are usable by the scheduler to transmit resource allocation information to one or more UEs allocating radio resources for a data transmission according to at least one of the following respective numerology schemes:
the control information region of at least one numerology scheme overlaps the control information region of at least one other numerology scheme;
the time-frequency radio resources of the control information region of one numerology scheme are usable for being allocated for a data transmission according to another numerology scheme;
a UE monitors the control information region of each of the one or more numerology schemes supported by the UE so as to receive resource allocation information destined to the UE; and
information on the control information region of the plurality of numerology schemes is transmitted by the scheduler to the one or more UEs.

6. The method according to claim 1, wherein a common control information region is defined within the reference resource set of one of the plurality of numerology schemes, wherein time-frequency radio resources of the common control information region are usable by the scheduler to transmit resource allocation information to UEs allocating radio resources for a data transmission according to at least another numerology scheme.

7. The method according to claim 1, wherein after performing the resource allocation procedure for the first numerology scheme, time-frequency radio resources allocated according to the first numerology scheme are re-allocated according to the second numerology scheme having a shorter scheduling time interval than the first numerology scheme by:
overwriting the time-frequency radio resources allocated according to the first numerology scheme, wherein information on the overwritten time-frequency radio resources is broadcast by the scheduler, or
overwriting the time-frequency radio resources allocated according to the first numerology scheme, and additionally performing rate matching for the subsequent time-frequency radio resources allocated according to the first numerology scheme, wherein information on the overwritten time-frequency radio resources is broadcast by the scheduler.

8. The method according to claim 1, wherein resource allocation information for time-frequency radio resources allocated according to the first numerology scheme indicates reserved time-frequency radio resources that are reserved within the allocated time-frequency radio resources for being allocated according to the second numerology scheme having a shorter scheduling time interval than the first numerology scheme.

9. A method for a user equipment receiving resource allocation information from a scheduler which allocates time-frequency radio resources in a wireless communication system, wherein a plurality of numerology schemes are defined, each partitioning a plurality of time-frequency radio resources of the wireless communication system into resource scheduling units in a different manner,
the method by implemented in the user terminal comprising:
receiving, from the scheduler, configuration information regarding a first reference resource set, which is configured out of the plurality of time-frequency radio resources, and regarding a second reference resource set, which is configured out of the plurality of time-frequency radio resources, wherein the second reference resource set overlaps with the first reference resource set in at least one of a frequency domain and a time domain;
the first reference resource set defining bounds of schedulable time-frequency radio resources that can be allocated according to a first numerology scheme out of the plurality of numerology schemes;
the second reference resource set defining bounds of schedulable time-frequency radio resources that can be allocated according to a second numerology scheme out of the plurality of numerology schemes; and
receiving and processing resource allocation information about the time-frequency radio resources of the respective reference resource set that are allocated by the scheduler to the user equipment according to the respective numerology scheme.

10. A scheduler for allocating time-frequency radio resources in a wireless communication system, wherein a plurality of numerology schemes are defined, each partitioning a plurality of time-frequency radio resources of the wireless communication system into resource scheduling units in a different manner,
the scheduler comprising:
a transmitter, which, in operation, transmits to one or more user equipments (UEs), configuration information regarding a first reference resource set, which is configured out of the plurality of time-frequency radio resources, and regarding a second reference resource set, which is configured out of the plurality of time-frequency radio resources, wherein the second reference resource set overlaps with the first reference resource set in at least one of a frequency domain and a time domain;
the first reference resource set defining bounds of schedulable time-frequency radio resources that can be allocated to one or more UEs according to a first numerology scheme out of the plurality of numerology schemes;
the second reference resource set defining bounds of schedulable time-frequency radio resources that can be allocated to one or more UEs according to a second numerology scheme out of the plurality of numerology schemes; and
circuitry, which, in operation, performs a resource allocation procedure for allocating the time-frequency radio resources of the respective reference resource set to the one or more UEs according to the respective numerology scheme.

11. A user equipment for receiving resource allocation information from a scheduler which allocates time-frequency radio resources in a wireless communication system, wherein a plurality of numerology schemes are defined, each partitioning a plurality of time-frequency radio resources of the wireless communication system into resource scheduling units in a different manner,
the user equipment comprising:
a receiver, which, in operation,
receives, from the scheduler, configuration information regarding a first reference resource set, which is configured out of the plurality of time-frequency radio resources, and regarding a second reference resource set, which is configured out of the plurality of time-frequency radio resources, wherein the second reference resource set overlaps with the first reference resource set in at least one of a frequency domain and a time domain;

the first reference resource set defining bounds of schedulable time-frequency radio resources that can be allocated according to a first numerology scheme out of the plurality of numerology schemes;

the second reference resource set defining bounds of schedulable time-frequency radio resources that can be allocated according to a second numerology scheme out of the plurality of numerology schemes; and receives, from the scheduler, resource allocation information; and circuitry, which, in operation, processes the resource allocation information, which indicates the time-frequency radio resources of the respective reference resource set that are allocated by the scheduler to the user equipment according to the respective numerology scheme.

12. The user equipment according to claim 11, wherein the plurality of numerology schemes are multiplexed across the plurality of time-frequency radio resources in a time domain and/or a frequency domain based on the respective reference resource sets without overlapping each other in the time domain or frequency domain.

13. The user equipment according to claim 11, wherein the receiver, in operation, receives information on the reference resource set for each numerology scheme through a broadcast made by the scheduler, wherein the reference resource set for each numerology scheme is configured in a semi-statically manner.

14. The user equipment according to claim 11, wherein for each numerology scheme, at least one control information region is defined within the reference resource set of the respective numerology scheme, wherein time-frequency radio resources of the control information region are usable by the scheduler to transmit resource allocation information to user equipments allocating radio resources for a data transmission according to at least one of the following respective numerology schemes:

the control information region of at least one numerology scheme overlaps the control information region of at least one other numerology scheme;

the time-frequency radio resources of the control information region of one numerology scheme are usable for being allocated for a data transmission according to another numerology scheme;

the user equipment monitors the control information region of each of the one or more numerology schemes supported by the user equipment so as to receive the resource allocation information destined to the user equipment; and information on the control information region of the plurality of numerology schemes is transmitted by the scheduler to the user equipment.

15. The user equipment according to claim 11, wherein a common control information region is defined within the reference resource set of one of the plurality of numerology schemes, wherein time-frequency radio resources of the common control information region are usable by the scheduler to transmit resource allocation information to user equipments allocating radio resources for a data transmission according to at least another numerology scheme, wherein the user equipment monitors the common control information region so as to receive the resource allocation information destined to the user equipment.

* * * * *